United States Patent
Meyer et al.

(10) Patent No.: US 9,910,716 B2
(45) Date of Patent: Mar. 6, 2018

(54) SYNCHRONIZATION IN A MULTI-PROCESSOR COMPUTING SYSTEM

(71) Applicant: KnuEdge Incorporated, San Diego, CA (US)

(72) Inventors: Douglas B. Meyer, San Diego, CA (US); Andrew White, Austin, TX (US); Jerome V. Coffin, San Diego, CA (US); Michael George Creamer, San Diego, CA (US)

(73) Assignee: KnuEdge Incorporated, San Diego, CA (US)

( * ) Notice: Subject to any disclaimer, the term of this patent is extended or adjusted under 35 U.S.C. 154(b) by 230 days.

(21) Appl. No.: 15/068,166

(22) Filed: Mar. 11, 2016

(65) Prior Publication Data

US 2017/0262318 A1  Sep. 14, 2017

(51) Int. Cl.
*G06F 9/52* (2006.01)
(52) U.S. Cl.
CPC .............. *G06F 9/52* (2013.01); *G06F 9/522* (2013.01)
(58) Field of Classification Search
CPC ..................................................... G06F 9/522
See application file for complete search history.

(56) References Cited

U.S. PATENT DOCUMENTS

| 2012/0159019 A1* | 6/2012 | Inoue | G06F 9/522 710/58 |
| 2014/0164735 A1* | 6/2014 | Dobbs | G06F 9/522 712/30 |
| 2015/0160965 A1* | 6/2015 | Archer | G06F 9/5066 718/107 |

* cited by examiner

*Primary Examiner* — Albert Wang
(74) *Attorney, Agent, or Firm* — Fish & Richardson P.C.

(57) ABSTRACT

In one aspect, a method implemented by a first sync controller includes receiving sync information, wherein the sync information (i) identifies a first sync process, (ii) indicates that the first sync controller is not a master controller of the first sync process, and (iii) identifies a group of components executing the first sync process, the group comprising a first processing device; receiving a first sync indication from the first processing device; storing an indication, associated with the first sync process, that the first sync indication was received from the first processing device; determining that a sync indication has been received from all components of the first group of components; and transmitting a second sync indication to a second sync controller.

21 Claims, 14 Drawing Sheets

SYNCHRONIZATION IN A MULTI-PROCESSOR COMPUTING SYSTEM

BACKGROUND

This specification relates to synchronization within a multi-processor computing system.

Information-processing systems are computing systems that process electronic and/or digital information. Typical information-processing systems may include multiple processing devices capable of concurrent and/or independent operation. Such systems may be referred to as multi-processor computing systems. Synchronization mechanisms in such systems may involve traps, signals, atomic instructions, or other mechanisms implemented in hardware, software, and/or combinations thereof.

SUMMARY

This specification describes a computing system that includes multiple processing devices. Each of the processing devices may include multiple processor cores that provide computational capabilities for the computing system. The processing devices may include input and output ports for communication of data between each other. A processing device may need to synchronize with one or more other processing devices and/or a host in the computing system to process data and perform data transfers.

To synchronize the processing devices and/or the host, the computing system includes multiple levels of hierarchically organized synchronization ("sync") controllers. A first-level sync controller may be directly or indirectly connected with multiple second-level sync controllers and connected with the host, and each of the second-level sync controllers may be connected with a group of one or more processing devices. Any combination of sync controllers, processing devices, and the host device may participate in a sync process for synchronizing one or more processing devices and/or the host device.

Various implementations of the subject matter described here may include systems, devices, methods or combinations thereof.

In an implementation, a system includes a host device, processing devices, a first-level sync controller, a first second-level sync controller, and a second second-level sync controller. The host device is configured to transmit instructions and data to the processing devices and to transmit sync information to the first-level sync controller, the first second-level sync controller, and the second second-level sync controller. The first-level sync controller is configured to receive a first portion of the sync information, wherein the first portion (i) identifies a first sync process, (ii) indicates that the first-level sync controller is a master controller of the first sync process; and (iii) identifies a group of second-level sync controllers that are executing the first sync process, the group of second-level controllers including the first second-level sync controller and the second second-level sync controller. The first second-level sync controller is configured to receive a second portion of the sync information, wherein the second portion (i) identifies the first sync process and (ii) identifies a first group of processing devices that are executing the first sync process. The second second-level sync controller is configured to receive a third portion of the sync information, wherein the third portion (i) identifies the first sync process and (ii) identifies a second group of processing devices that are executing the first sync process. A first processing device of the plurality of processing devices is configured to execute a first plurality of instructions and transmit a first sync indication to the first second-level controller. A second processing device of the plurality of processing devices is configured to execute a second plurality of instructions and transmit a second sync indication to the second second-level controller. The first second-level controller is configured to: receive the first sync indication from the first processing device; store an indication, associated with the first sync process, that the first sync indication was received from the first processing device; determine that a sync indication has been received from all processing devices of the first group of processing devices; and transmit a third sync indication to the first-level controller. The second second-level controller is configured to: receive the second sync indication from the second processing device; store an indication, associated with the first sync process, that the second sync indication was received from the second processing device; determine that a sync indication has been received from all processing devices of the second group of processing devices; and transmit a fourth sync indication to the first-level controller. The first-level controller is configured to: receive the third sync indication; store an indication, associated with the first sync process, that the third sync indication was received from the first second-level controller; receive the fourth sync indication; store an indication, associated with the first sync process, that the fourth sync indication was received from the second second-level controller; determine that a sync indication has been received from all second-level controllers in the group of second-level controllers; and transmit a notification that the first sync process is complete.

The first-level controller may be configured to send the notification to the host device. The first-level controller may further be configured to transmit a first notification to the first second-level controller and to transmit a second notification to the second second-level controller; and the first second-level controller may be configured to send a third notification to the first processing device.

The first processing device may be configured to execute instructions in response to receiving the third notification from the first second-level controller.

The host device may transmit the sync information indirectly to the first-level sync controller, the first second-level sync controller, and the second second-level sync controller.

The first-level controller may further be configured to determine a time for transmission of notifications to processing devices; include the time in the first notification; and the first second-level controller may be configured to send the third notification at the determined time.

The first processor may be configured to send the first sync indication by changing a state of an output pin of the first processing device.

In an implementation, a method, implemented by a first sync controller, includes receiving sync information, wherein the sync information (i) identifies a first sync process, (ii) indicates that the first sync controller is not a master controller of the first sync process, and (iii) identifies a group of components executing the first sync process, the group comprising a first processing device; receiving a first sync indication from the first processing device; storing an indication, associated with the first sync process, that the first sync indication was received from the first processing device; determining that a sync indication has been received from all components of the first group of components; and transmitting a second sync indication to a second sync controller.

The method may further included receiving from the second sync controller a first notification that the first sync process is complete; and transmitting a second notification to the first processing device that the first sync process is complete.

Storing the indication may include storing a value in a register.

Transmitting the second sync indication to the second controller may include using a serial connection.

Receiving the first sync indication comprises reading a state of an output pin of the first processing device.

The second sync controller may be a master controller for the first sync process.

The sync information may (i) identify a second sync process, (ii) indicate that the first sync controller is a master controller of the second sync process, and (iii) identify a second group of components executing the second sync process.

Transmitting the second sync indication to the second sync controller may include sending a packet.

The group of components may include a buffer, in which case the method further may include receiving a third sync indication from the buffer.

In an implementation, a processing device includes processor cores; a first input port for receiving data; a first output port for transmitting data; a second input port for receiving sync indications; a second output port for transmitting sync indications; at least one memory having executable instructions that configure the processing device to perform operations including: receive first data via the first input port; process the first data with at least one processor core to generate second data; transmit the second data via the first output port; determine that criteria have been satisfied for sending a sync indication; transmit a sync indication to a sync controller via the second output port in response to determining that the criteria have been satisfied; receive a sync notification via the second input port; and perform subsequent processing in response to receiving the sync notification.

The first input port may include a serial connection, and the at least one memory may including executable instructions that, when executed, configure the processing device to receive first data via the first input port such that the at least one memory having executable instructions that configure the processing device to receive packets includes the first data via the serial connection.

The first output port may include a serial connection, and the at least one memory may include executable instructions that, when executed, configure the processing device to transmit the second data via the first output port such that the at least one memory having executable instructions configures the processing device to transmit packets including the second data via the serial connection.

The second output port may include a wire connection, and the at least one memory may include executable instructions that, when executed, configure the processing device to transmit the sync indication to the sync controller via the second output port such that the at least one memory having executable instructions configures the processing device to assert a signal that is transmitted over the wire connection via the second output port.

The second input port may include a wire connection, and the at least one memory including executable instructions that, when executed, configure the processing device to receive the sync notification via the second input port such that the at least one memory including executable instructions configures the processing device to receive an asserted signal transmitted over the wire connection via the second input port.

Details of one or more implementations of the subject matter described in this specification are set forth in the accompanying drawings and description below. Other features, aspects, and potential advantages of the subject matter will become apparent from the description, the drawings, and the claims.

DETAILED DESCRIPTION

Figure 1:
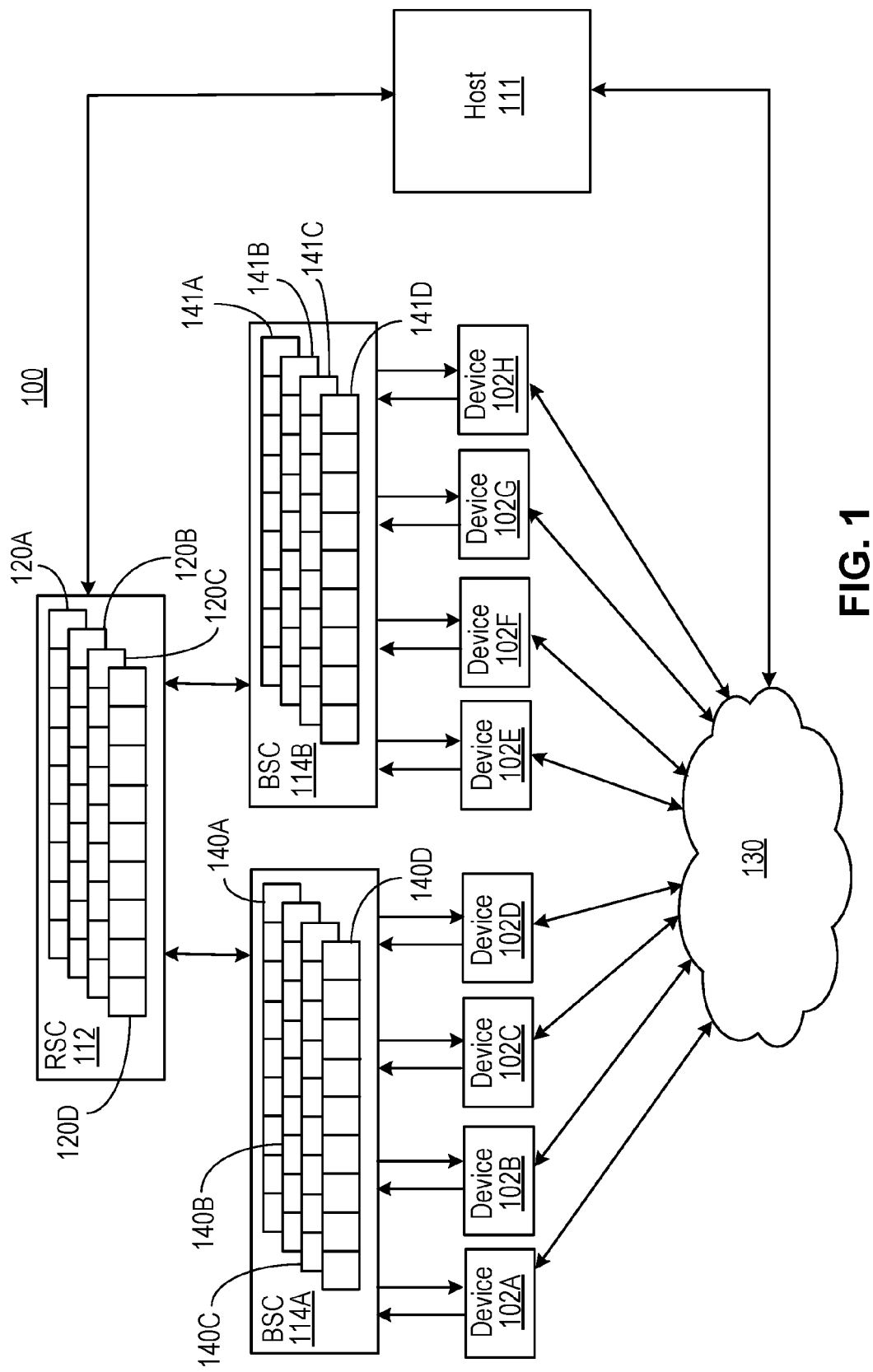
FIG. 1 is a block diagram of an example of a computing system.

FIG. 1 shows an example of a computing system 100. The computing system 100 includes processing devices 102A-H, which may also be referred to as devices 102A-H. Each of the processing devices 102A-H may include a memory for storing data and a plurality of processor cores to provide computational capabilities for the computing system 100. Unless specifically expressed otherwise, data as used herein may refer to both program code and pieces of information upon which the program code operates.

Each of the processing devices 102A-H is configured to communicate data with other devices 102A-H of the computing system 100 and/or other computing devices such as a host 111. Data communication between different computing resources of the computing system 100 may be implemented using routable packets. A communication network 130 for data communication among processing devices 102A-H and the host 111 may be implemented using any known communication technology, for example, Gigabit Ethernet, or any other existing or future-developed communication technology. For example, each of the processing devices 102A-H may include bi-directional high-speed serial ports, such as 10 Giga bits per second (Gbps) serial ports, for data communication. Two processing devices 102 that include such high speed serial ports may be coupled via one pair or multiple pairs of high speed interfaces. Processing devices 102A-H may be connected directly to other processing devices 102A-H or may be connected via other devices, such as a router.

Computing system 100 and processing devices 102A-H may additionally include any of the features described in U.S. application Ser. No. 14/608,489 with title Uniform System Wide Addressing for a Computing System filed on Jan. 29, 2015; U.S. application Ser. No. 14/608,505 with title Mapping Processes to Processors in a Network on a Chip Computing System filed on Jan. 29, 2015; U.S. application Ser. No. 14/608,515 with title Memory Controller for a Network on a Chip Device filed on Jan. 29, 2015; U.S. application Ser. No. 14/608,670 with title Topology Discovery in a Computing System filed on Jan. 29, 2015; and U.S. application Ser. No. 14/608,693 with title Synchronization in a Computing System with Multi-Core Processing Devices filed on Jan. 29, 2015. Each of U.S. application Ser. No. 14/608,489; U.S. application Ser. No. 14/608,505; U.S. application Ser. No. 14/608,515; U.S. application Ser. No. 14/608,670; and U.S. application Ser. No. 14/608,693 are hereby incorporated by reference in their entirety for all purposes.

Any number of the processing devices 102 and/or the host 111 in the computing system 100 may simultaneously execute program instructions. The program instructions being executed by the processing devices 102 and/or host 111 may be different portions of the same program code. For example, a first processing device 102A may be assigned to execute a specific function of the program code. The first processing device 102A performs the task specified by the function, passes the data generated from performing the task to a second processing device 102B, and performs the task again on a new set of data. The second processing device 102B may be assigned to execute another function of the program code that uses the data generated by the first processing device 102A. The first processing device 102A and the second processing device 102B may need to synchronize to perform the data transfer and the processing of the data.

As an example, the computing system 100 may be used to perform computational fluid dynamics to analyze problems that involve fluid flows. The processing devices 102 and/or the host 111 may be used to perform the calculations for simulating the interaction of liquids or gases with surfaces, e.g., air flowing around an airplane wing. The surface may be divided into discrete cells. A processing device may be assigned to a cell to perform the calculations for that cell. Each processing device may perform the processing for its respective cell, wait for a processing device assigned to a neighboring cell to complete processing, and then transfer its data to the processing device assigned to the neighboring cell. The processing devices 102 may transfer data to the host 111 for visualization of the resulting solution. The processing devices 102 and the host 111 may need to synchronize to perform the data transfers and the processing of the data.

Sync Controllers

To synchronize the processing devices 102 and/or the host 111, the computing system 100 may include hierarchically organized synchronization ("sync") controllers. The sync controllers may include a first-level sync controller, referred to as the root sync controller (RSC) 112. The RSC 112 may be connected with second-level sync controllers, which may be referred to as board sync controllers (BSCs) 114, and may be connected with the host 111. In some implementations, there may be zero or more levels of intermediate sync controllers (ISCs) (not shown) connected between the RSC 112 and the BSCs 114. The sync controllers may be implemented using any combination of microprocessors, microcontrollers, field programmable gate arrays (FPGAs), and/or application specific integrated circuits (ASICs).

Each of the BSCs 114 may be connected with two or more processing devices 102 as shown in FIG. 1. A BSC 114 and corresponding processing devices 102 may be implemented on a processor board. For example, the BSC 114A and the processing devices 102A-102D may be implemented on a processor board, and the BSC 114B and the processing devices 102E-102H may be implemented on another processor board. Each of the processing devices 102 may manage synchronization of processor cores within the processing device. Additional details regarding synchronization within a processing device are described in U.S. application Ser. No. 14/937,437, filed on Nov. 10, 2015, the entire contents of which are hereby incorporated by reference.

Any combination of the sync controllers, processing devices 102, and the host 111 may participate in a sync process for synchronization of the processing devices 102 and the host 111. For example, the BSC 114A may participate in sync processes that synchronize two or more of the processing devices 102A-102D. The BSC 114B may participate in executing sync processes that synchronize two or more of the processing devices 102E-102H. The RSC 112 may participate in executing sync processes that synchronize one or more of the processing devices 102A-102H with the host 111, and in executing sync processes that synchronize one or more of the processing devices 102A-102D with one or more of the processing devices 102E-102H. Each sync controller may participate in executing one or more sync processes at any given time, and each sync process may be associated with an identifier or a sync process ID to distinguish it from other sync processes.

In the computing system 100, a sync process may be executed by sync controllers that are located as low in the tree structure as possible. By doing this, communication bandwidth toward the RSC 112 may be conserved and, when possible, synchronization may be completely controlled by sync controllers below the RSC 112. This may reduce the burden on the RSC 112 and may result in reduced latency since synchronization need not travel all the way to the apex of the tree. The hierarchical structure of the computing system 100 may provide consolidation, rather than accumulation or concatenation, of sync indications and sync notifications moving upward and downward in the computing system. The architecture may eliminate any fan-in/fan-out problems at the top level of the hierarchy, which may occur if all processing devices 102 and the RSC 112 had to communicate directly with each other.

A sync process may be associated with a sync region that identifies hardware, software, or other logical components that are participating in the sync process. For example, a sync region may specify that any of processing devices 102A-H are participating in a sync process. Other components not shown in FIG. 1 may also participate in a sync process. For example, a sync process may include monitoring the state of buffers and the buffers may be part of a sync region. Additional details regarding monitoring the state of buffers are described in U.S. application Ser. No. 15/010,091, filed on Jan. 29, 2016, the entire contents of which are hereby incorporated by reference. A sync region may also include host 111 or specific programs or operations executed by the host. Lower level sync controllers may only include information about a sub-region of the entire sync region. For example, where RSC 112 is the master controller, BSC 114A may include information relating to only a sub-region of the sync region.

Each of the sync controllers in the computing system 100 may include storage, such as tiles, e.g., sets of registers, for monitoring states of sync processes that are being executed by the sync controller. The RSC 112 may include tiles 120A-120D for monitoring states of sync processes that the RSC 112 is executing. Each of the tiles 120A-120D may include a register for storing a sync process ID that the RSC 112 is executing. Each of the tiles 120A-120D may also include registers for storing states of components that are connected with the RSC 112 and indicating the sync region or components that are participating in executing the corresponding sync process. For example, the registers of tile 120A may store states of the BSC 114A and the host 111 that may be participating in executing a sync process. The registers of tile 120B may store states of the BSC 114B and the host 11 that may be participating in executing a sync process. The registers of tile 120C may store states of the BSC 114A, the BSC 114B, and the host 111 that may be participating in executing a sync process. The registers of tile 120D may store states of the BSC 114A and the BSC 114B that may be participating in executing a sync process. Because the RSC 112 is the highest level sync controller required for all sync processes the RSC 112 is executing, the RSC 112 may be referred to as the master controller for all sync processes that the RSC 112 is executing.

The BSC 114A may include tiles 140A-140D for monitoring states of sync processes that the BSC 114A is executing. Each of the tiles 140A-140D may include a register for storing a sync process ID that the BSC 114A is executing. Each of the tiles 140A-140D may include a register for storing an indicator of whether the BSC 114A is the master controller of the corresponding sync process. The BSC 114A may be the master controller of any sync processes that synchronize only processing devices 102A-102D because the BSC 114A is the highest level sync controller required for those sync processes. Each of the tiles 140A-140D may also include registers for storing states of components that are connected with the BSC 114A and that are participating in executing the corresponding sync process. For example, the registers of tile 140A may store states of the processing devices 102A and 102B that may be participating in executing a sync process. The registers of tile 140B may store states of the processing devices 102A and 102C that may be participating in executing a sync process. The registers of tile 140C may store states of the processing devices 102B-102D that may be participating in executing a sync process. The registers of tile 140D may store states of the processing devices 102A, 102C, and 102D that may be participating in executing a sync process.

The BSC 114B may include tiles 141A-141D for monitoring states of sync processes that the BSC 114B is executing. Each of the tiles 141A-141D may include a register for storing a sync process ID that the BSC 114B is executing. Each of the tiles 141A-141D may include a register for storing an indicator of whether the BSC 114B is the master controller of the corresponding sync process. The BSC 114B may be the master controller of any sync processes that synchronize only processing devices 102E-102H because the BSC 114B is the highest level sync controller required for those sync processes. Each of the tiles 141A-141D may also include registers for storing states of components that are connected with the BSC 114B and that are participating in executing the corresponding sync process. For example, the registers of tile 141A may store the state of the processing device 102E that may be participating in executing a sync process. The registers of tile 141B may store states of the processing devices 102F and 102G that may be participating in executing a sync process. The registers of tile 141C may store states of the processing devices 102E-102H that may be participating in executing a sync process. The registers of tile 141D may store states of the processing devices 102E, 102G, and 102H that may be participating in executing a sync process.

Generally, a tile may include an event flag enable (EFE) register and an event flag status (EFS) register. The EFE register may indicate the sync region or which components connected with the corresponding sync controller are participating in executing the corresponding sync process, and the EFS register may store the current states of the components. The tile may include a mode bit that indicates whether a logical AND or a logical OR operation should be applied when comparing the EFE and the EFS registers. The sync controller may apply the operation indicated by the mode bit to compare the EFE and the EFS registers to determine whether sync criteria for the sync process have been satisfied.

The sync controllers may be configured by computing resources of the computing system. For example, a computing resource, e.g., a processing device 102 or the host 111, may send sync information to the sync controllers to configure the EFE registers of the sync controller. The computing resource may transmit data, e.g., in the form of data packets, that include the sync information to the sync controllers. The sync information may identify a sync process, identify which sync controller is the master controller of the sync process, identify which sync controllers are participating in executing the sync process, identify which processing devices are participating in executing the sync process, identify whether the host is participating in executing the sync process, and specify other values for the tile such as the mode bit. The sync controllers receive the sync information and, for example, configure their EFE registers to indicate which corresponding components are participating in executing the sync process.

An example of synchronization of two processing devices connected with the same sync controller, e.g., processing devices 102A and 102B connected with BSC 114A, will now be described. The host 111 may send sync information to the BSC 114A to configure BSC 114A for a sync process that involves processing devices 102A and 102B. The sync information identifies the BSC 114A as the master controller of the sync process. The BSC 114A configures an EFE register in tile 140A for the sync process by setting bits in the tile 140A to indicate that it is the master controller of the sync process and to indicate that processing devices 102A and 102B are participating in executing the sync process. When the processing device 102A has determined that it has satisfied its sync criteria for the sync process, the processing device 102A sends a sync indication to the BSC 114A. The BSC 114A sets a flag in the EFS register of tile 140A to indicate that it has received a sync indication from the processing device 102A. The BSC 114A compares the EFS register with the EFE register of tile 140A to determine whether it has received sync indications from both the processing devices 102A and 102B. Because the bit in the EFS register corresponding to the processing device 102B is not yet set, the BSC 114A determines that it has not received sync indications from all required processing devices. When the processing device 102B determines that it has satisfied its sync criteria for the sync process, processing device 102B sends a sync indication to the BSC 114A. The BSC 114A sets a flag in the EFS register of tile 140A to indicate that it has received a sync indication from the processing device 102B. The BSC 114A compares the EFS register with the EFE register of tile 140A and determines that it has received sync indications from both processing devices 120A and 102B. The BSC 114A may then generate and send a sync notification that the sync process is complete to other devices. In some implementations, the sync notifications may be sent to the processing devices 102A and 102B.

An example of synchronization of two processing devices connected with two different sync controllers, e.g., processing device 102A connected with BSC 114A and processing device 102E connected with BSC 114B, will now be described. The host 111 may send sync information for a sync process to the BSC 114A, the BSC 114B, and the RSC 112. The sync information indicates that the RSC 112 is the master controller of the sync process. The sync information also indicates that the RSC 112, the BSC 114A, the BSC 114B, the processing device 102A, and the processing device 102E are participating in executing the sync process. The RSC 112 configures an EFE register of tile 120A for the sync process and sets bits to indicate that the BSC 114A and the BSC 114B are participating in the executing of the sync process. The BSC 114A configures an EFE register of tile 140B for the sync process and sets bits to indicate that the processing device 102A is participating in executing the sync process. The BSC 114B configures an EFE register of a tile 141A for the sync process and sets bits to indicate that the processing device 102E is participating in executing the sync process.

When the processing device 102A determines that it has satisfied its sync criteria for the sync process, the processing device 102A sends a sync indication to the BSC 114A. The BSC 114A sets a flag in the EFS register of tile 140B to indicate that it has received a sync indication from the processing device 102A. The BSC 114A compares the EFS register with the EFE register to determine that it has received the sync indication from all components of the sync sub-region (here just device 102A). The BSC 114A sends a sync indication to the RSC 112 to indicate that it has received a sync indication from all components of its sync sub-region. The RSC 112 sets a flag in its EFS register of tile 120A to indicate that it has received a sync indication from the BSC 114A. The RSC 112 compares its EFS register with its EFE register of tile 120A and determines that it has not received a sync indication from the BSC 114B.

When the processing device 102E determines that it has satisfied its sync criteria for the sync process, processing device 102E sends a sync indication to the BSC 114B. The BSC 114B sets a flag in its EFS register of tile 141A to indicate that BSC 114B has received the sync indication from processing device 102E. The BSC 114B compares its EFS register with its EFE register of tile 141A and determines that it has received a sync indication all components of its sync sub-regions (here just device 102E). The BSC 114B sends a sync indication to the RSC 112 to indicate that it has received sync indication from all components of its sync sub-region. The RSC 112 sets a flag in its EFS register of tile 120A to indicate that it has received a sync indication from the BSC 114B. The RSC 112 compares its EFS register with its EFE register of tile 120A to determine that it has received sync indications from all components of the sync region. The RSC 112 may then generate and send a sync notification that the sync process is complete to other devices, such as to the BSC 114A and the BSC 114B. After the BSC 114A receives the notification from the RSC 112, the BSC 114A may generate and send a notification that the sync process is complete to other devices, such as to the processing device 102A. After the BSC 114B receives the notification from the RSC 112, the BSC 114B may generate and send a notification that the sync process is complete to other devices, such as to the processing device 102E.

The RSC 112 may also participate in synchronization of one or more processing devices 102, e.g., processing device 102C, with an application running on the host 111. The host 111 may send sync information for the sync process to the BSC 114A and the RSC 112. The sync information indicates that the RSC 112 is the master controller of the sync process. The sync information also indicates that the RSC 112, BSC 114A, the processing device 102C, and the host 111 are participating in executing the sync process. The RSC 112 configures an EFE register of tile 120B for the sync process and sets bits to indicate that the BSC 114A and the host 111 are participating in the executing of the sync process. The BSC 114A configures an EFE register of tile 140C for the sync process and sets bits to indicate that the processing device 102C is participating in executing the sync process.

When the processing device 102C determines that it has satisfied its sync criteria for the sync process, the processing device 102C sends a sync indication to the BSC 114A. The BSC 114A sets a flag in the EFS register of tile 140C to indicate that it has received a sync indication from the processing device 102C. The BSC 114A compares the EFS register with the EFE register to determine that it has received the sync indication from all components of its sync sub-region (here just device 102C). The BSC 114A sends a sync indication to the RSC 112 to indicate that it has received a sync indication from all components of its sync sub-region. The RSC 112 sets a flag in its EFS register of tile 120B to indicate that it has received a sync indication from the BSC 114A. The RSC 112 compares its EFS register with its EFE register of tile 120B and determines that it has not received a sync indication from the host 111.

When the host 111 determines that it has satisfied its sync criteria for the sync process, the host 111 sends a sync indication to the RSC 112. The RSC 112 sets a flag in its EFS register of tile 120B to indicate that it has received a sync indication from the host 111. The RSC 112 compares its EFS register with its EFE register of tile 120B to determine that it has received sync indications from all components of the sync region. The RSC 112 may then generate and send a sync notification that the sync process is complete to the BSC 114A and the host 111. After the BSC 114A receives the notification from the RSC 112, the BSC 114A may generate and send a notification that the sync process is complete to other devices, such as the processing device 102C. The processing device 102C and the host 111 may perform subsequent processing in response to receiving the sync notification.

In some implementations, multiple software components in the host 111 may participate in a sync process. In some implementations, the host 111 may send sync indications to the RSC 112 as each software component satisfies its sync criteria for the sync process, and the RSC 112 sets flags in a tile for the sync process to indicate the states of the software components. In some implementations, the host 111 may wait until all the software components have satisfied their sync criteria for the sync process and send one sync indication to the RSC 112 when all the components have satisfied their sync criteria, and the RSC 112 sets a flag in a tile for the sync process to indicate it has received a sync indication from the host 111 that indicates that all the software components participating in the sync process have satisfied their sync criteria.

In some implementations, one or more components of the computing system 100 may participate in a sync process and receive sync notifications that the sync process has completed without being required to send sync indication to a sync controller at a higher level in the hierarchy. For example, the host 111 may send sync information for a sync process to the BSC 114A, the BSC 114B, and the RSC 112. The sync information indicates that the RSC 112 is the master controller of the sync process. The sync information also indicates that the RSC 112, the BSC 114A, the BSC 114B, the processing device 102A, the processing device 102E, and the processing device 102F are participating in the sync process. The sync information also indicates that the status flag in BSC 114B for processing device 102F should be set in an EFS register of a tile associated with the sync process.

Upon receiving the sync information, the RSC 112 configures an EFE register of tile 120D for the sync process and sets bits to indicate that the BSC 114A and the BSC 114B are participating in the executing of the sync process. The BSC 114A configures an EFE register of tile 140D for the sync process and sets bits to indicate that the processing device 102A is participating in executing the sync process. The BSC 114B configures an EFE register of a tile 141D for the sync process and sets bits to indicate that the processing devices 102E and 102F are participating in executing the sync process. The BSC 114B also configures an EFS register of the tile 141D to set the status flag for the processing device 102F. The set status flag indicates that the processing device 102F has satisfied its sync criteria for the sync process. After configuring the EFS register of the tile 141D, the BSC 114B compares its EFS register with its EFE register of tile 141D and determines that it has not received a sync indication from the processing device 102E, and thus determines that it has not met its sync criteria for sending a sync indication to the RSC 112.

When the processing device 102A determines that it has satisfied its sync criteria for the sync process, the processing device 102A sends a sync indication to the BSC 114A. The BSC 114A sets a flag in the EFS register of tile 140D to indicate that it has received a sync indication from the processing device 102A. The BSC 114A compares the EFS register with the EFE register to determine that it has received the sync indication from the required processing device 102A. The BSC 114A sends a sync indication to the RSC 112 to indicate that it has received a sync indication from the processing device 102A. The RSC 112 sets a flag in its EFS register of tile 120A to indicate that it has received a sync indication from the BSC 114A. The RSC 112 compares its EFS register with its EFE register of tile 120D and determines that it has not received a sync indication from the BSC 114B.

When the processing device 102E determines that it has satisfied its sync criteria for the sync process, processing device 102E sends a sync indication to the BSC 114B. The BSC 114B sets a flag in its EFS register of tile 141D to indicate that the processing device 102E has received the sync indication from processing device 102E. The BSC 114B compares its EFS register with its EFE register of tile 141D and determines that both processing devices 102E and 102F have met their sync criteria for the sync process. The BSC 114B sends a sync indication to the RSC 112 to indicate that all processing devices connected to BSC 114B participating in the sync process have met their sync criteria. The RSC 112 sets a flag in its EFS register of tile 120D to indicate that it has received a sync indication from the BSC 114B. The RSC 112 compares its EFS register with its EFE register of tile 120D to determine that it has received sync indications from both the BSC 114A and the BSC 114B. The RSC 112 then generates and sends a sync notification that the sync process is complete to the BSC 114A and the BSC 114B. After the BSC 114A receives the notification from the RSC 112, the BSC 114A generates and sends a notification that the sync process is complete to the processing device 102A. After the BSC 114B receives the notification from the RSC 112, the BSC 114B generates and sends a notification that the sync process is complete to the processing devices 102E and 102F.

In some implementations, the BSCs 114 and the processing devices 102 may communicate sync indications and sync notifications via wires that transmit signals between the BSCs 114 and the processing devices 102. For example, a processing device 102 may transmit a sync indication to a BSC 114 by asserting a sync status signal on a wire connecting the processing device 102 with the BSC 114. A BSC 114 may transmit a sync notification to a processing device 102 that a sync process has completed by asserting a sync complete signal on a wire connecting the BSC 114 with the processing device 102.

A processing device 102 and a BSC 114 may be connected by multiple wires for communicating sync indication and sync notifications, and each sync process may be associated with one or more wires between the processing device 102 and the BSC 114. For example, a processing device 102 may include 4 input ports and 4 output ports, and a BSC 114 may include 4 input ports and 4 output ports for each processing device 102 connected with the BSC 114. Such a computing system may support up to 4 concurrently executing sync processes, with each sync process associated with an input port and an output port of the processing device 102 and a corresponding input port and output port of the BSC 114. When the BSC 114 configures a tile for a sync process, the BSC 114 may configure the tile to associate the sync process with one or more input and output ports of the BSC 114 for receiving sync indication and transmitting sync notifications to each processing device 102 participating in the sync process.

In some implementations, a tile may include a re-arm bit that indicates whether the tile will automatically prepare for another identical sync process. If the re-arm bit of a tile is set, the EFS registers in the tile may be automatically cleared after the sync region criteria is completed, and the tile may then be ready to monitor the sync conditions for the sync criteria to be met again. In a sync controller that is a sync region master, the re-arm may occur after the sync controller sends sync notifications. In a sync controller that is not a sync region master, the re-arm may occur after it receives a sync notification from the upstream sync controller.

A tile may include an output selection register. The output selection register may specify an operation to perform when a sync process is complete. For example, the output selection register may specify that an interrupt is to be sent to the control plane to notify the system software that a sync process is complete. As another example, the output selection register may specify that a sync notification is to be sent to downstream sync controllers.

In some implementations, the computing system may be configured to synchronize the transmission of sync notifications. A BSC that is closer to the RSC may receive sync notification more quickly than a BSC that is further away. If the BSCs immediately act on a sync notification, processing devices may receive sync notifications at different times.

To synchronize the sending of sync notifications, the computing system may use counters that are synchronized and used as the system time. The RSC or sync region master may generate a sync notification that includes a time to send the sync notifications to processing devices. In some implementations, the time may be the current time plus an amount of time that accounts for the worst-case transmission latency. In some implementations, the time may be an actual time of day. In this manner, each ISC receiving the sync notification may immediately forward the sync notification to downstream sync controllers. Each BSC may wait until its local counter has reached the designated time to send the sync notification. Thus, all BSCs may operate in sync when sending the sync notifications to processing devices.

In some implementations, the sync controllers and the host 111 may communicate sync information, sync indications, and sync notifications with each other directly or indirectly (e.g., via other hardware or software components) by transmitting packets over serial connections such as Gigabit Ethernet or any other existing or future-developed communication technology. For example, the host 111 may transmit sync information to the BSCs 114 and the RSC 112 by sending sync process configuration packets to the BSCs 114 and the RSC 112. A BSC 114 and the host 111 may transmit sync indications to the RSC 112 by sending sync process status (SPS) packets to the RSC 112. The RSC 112 may transmit notifications that sync processes are complete to the BSCs 114 and the host 111 by sending sync process complete (SPC) packets to the BSCs 114 and the host 111. Each packet may include a sync process ID, and a component receiving the packet uses the sync process ID to associate the sync information, sync indication, or sync notification with a sync process.

Figure 2:
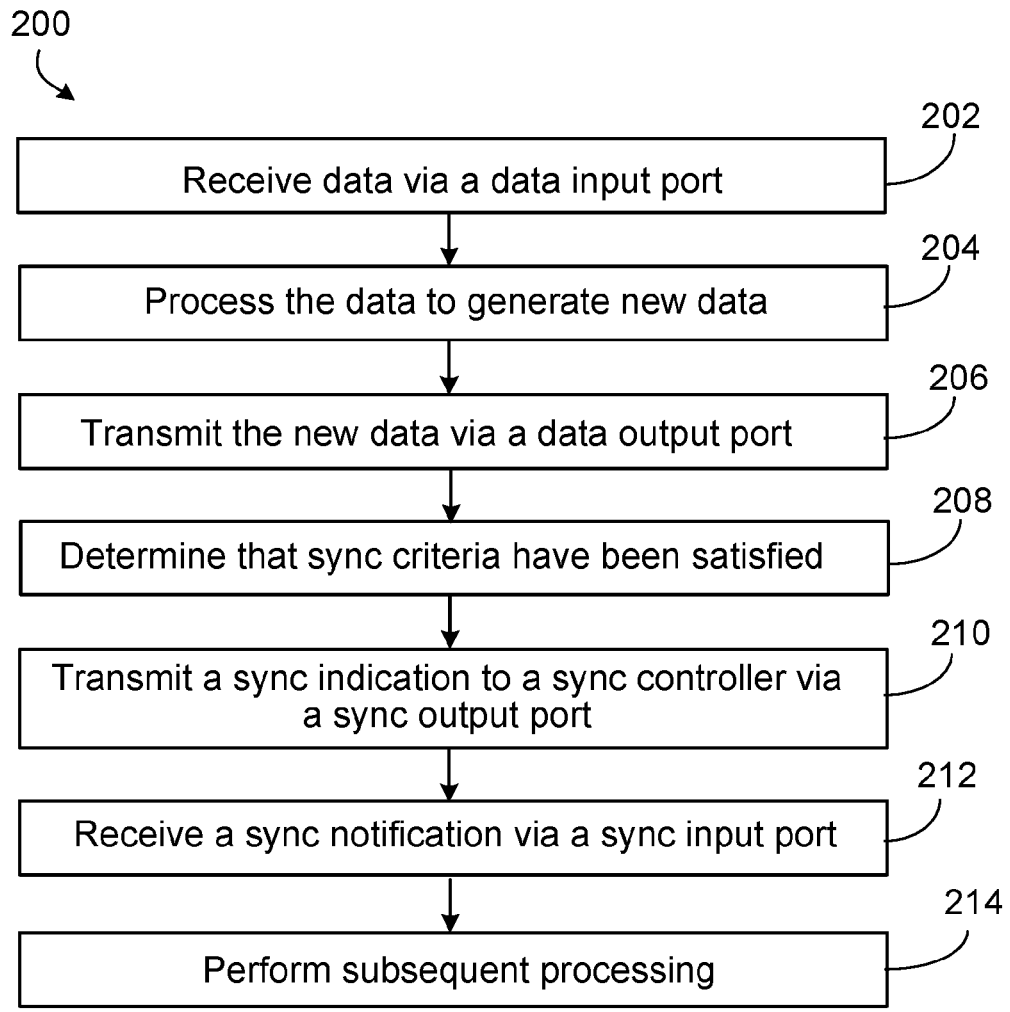
FIGS. 2 and 3 are flowcharts showing examples of processes for synchronization in a computing system.
Figure 3:
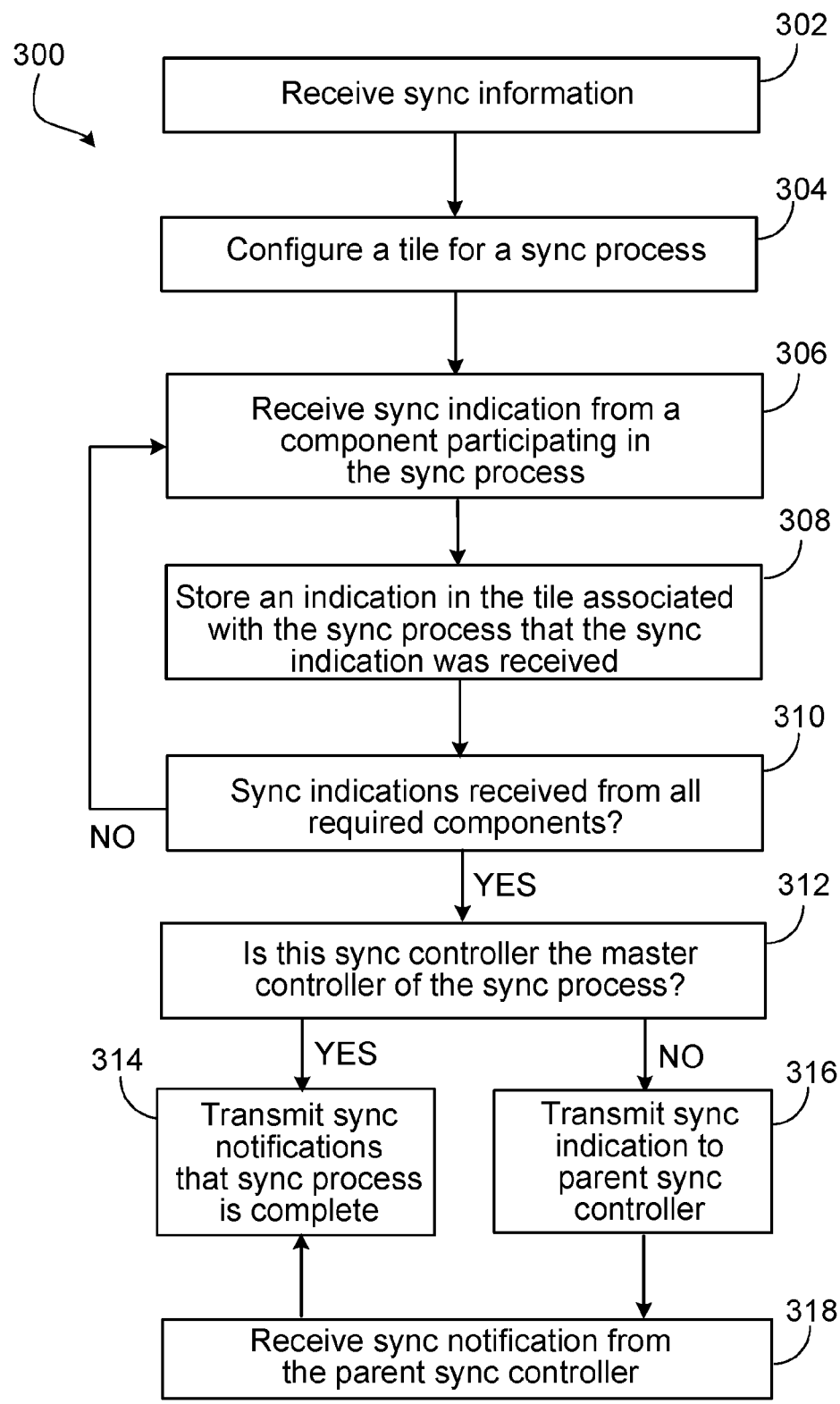

FIGS. 2 and 3 are flowcharts showing examples of processes for synchronization in a computing system, such as the computing system 100 previously described in FIG. 1. FIG. 2 is a flowchart showing an example of a process 200 performed by a processing device. FIG. 3 is a flowchart showing an example of a process 300 performed by a sync controller. The processes may include any combination of the details discussed above.

In FIG. 2, a processing device receives data via a data input port (202). The processing device processes the data with at least one processor core to generate new data (204) and may optionally transmit the new data via a data output port (206). The processing device may receive and transmit data using routable packets. A physical communication network for data communication may be implemented using any known communication technology, for example, Gigabit Ethernet, or any other existing or future-developed communication technology. For example, the processing device may include bi-directional high-speed serial ports, such as 10 Giga bits per second (Gbps) serial ports, for data communication.

The processing device determines that sync criteria have been satisfied for sending a sync indication (208). For example, the processing device may determine that sync criteria for the processing device have been satisfied when the processing device completes execution of a portion of program code or executes an instruction in program code. In response to determining that the criteria have been satisfied, the processing device transmits a sync indication to a sync controller via a sync output port (210). The processing device may, for example, transmit the sync indication by asserting a sync status signal via the sync output port, which transmits the sync status signal on a wire connecting the processing device with the sync controller.

The processing device may then receive a sync notification via a sync input port (212) and perform subsequent processing in response to receiving the sync notification (214). The sync notification may be an asserted sync complete signal that is received via the sync input port. The sync complete signal may be asserted by the sync controller and transmitted to the processing device on a wire connecting the sync controller to the processing device. The particular sync input and output ports used by the processing device may be preconfigured for a particular sync process.

In FIG. 3, a sync controller receives sync information (302). The sync information may identify a sync process, identify which sync controller is the master controller of the sync process, identify which sync controllers are participating in executing the sync process, identify which processing devices are participating in executing the sync process, identify whether the host is participating in executing the sync process, and specify other values such as the mode bit. The sync controller may configure a tile for the sync process (304) to indicate which components are participating in the sync process and required to transmit a sync indication to the sync controller.

After configuring the tile, the sync controller receives a sync indication from a component participating in the sync process (306). The sync controller may store an indication in the tile associated with the sync process to indicate that the sync indication was received from the component (308). The sync controller may store the indication by setting a flag associated with the component in the tile for the sync process.

The sync controller determines whether sync indications have been received from all required components (310). The sync controller may check the flags for the required components to determine whether all the flags have been set. If the sync controller determines that sync indications have not been received from all required components, the sync controller may return to 306 when it receives another sync indication from another component.

If the sync controller determines that sync indications have been received from all required components, the sync controller may determine whether it is the master controller of the sync process (312). The sync controller may check a master indicator in the tile to determine whether it is the master controller.

If the sync controller is the master controller of the sync process, the sync controller may transmit sync notifications to the downstream components that are connected to the sync controller and participating in the sync process (314). The sync notifications may inform the downstream components that the sync process is complete.

If the sync controller is not the master controller of the sync process, the sync controller transmits a sync indication to a parent sync controller (316). The sync controller may then receive a sync notification from the parent sync controller when the sync process is complete (318) and transmit sync notifications to the downstream components that are connected to the sync controller and participating in the sync process (314).

Control Plane

The computing system may include software components for managing the sync subsystem, referred to as the control plane. The software components of the control plane may include a primary system manager (PSM) at the apex of the system management tree and an intermediate system manager (ISM) running at lower levels, such as on each processor board. The PSM may have primary control over booting, configuring, and monitoring the computing system. The PSM may also export certain services (e.g., events and sync) to a user application running on a host. The PSM may manage the sync subsystem either directly, in the case of the RSC, or indirectly, in the case of the BSC(s). An ISM may provide an interface into the BSC. An ISM may run inside of a logic device, e.g., an FPGA. Alternatively, an ISM may run on an external processor. The ISM may be responsible for managing the resources on the processor board where it resides. There may be as many ISMs as there are processor boards in the computing system. Alternatively, there may be one ISM that interfaces with multiple processor boards. As another alternative, there may be no ISMs, and the PSM may interface with the BSCs. Other implementations of the control plane are possible.

FIGS. 4-7 show examples of configurations of computing systems. In FIGS. 4-7, a processor board is simplified to show an on-board logic device and processing devices. The sync subsystem includes an RSC, one or more BSCs, and ISCs in the processing devices.

The RSC may interface with the PSM so that the PSM is able to read/write all RSC registers and receive sync packets (such as discovery response packets) that have arrived at the RSC. The PSM may process the sync packets that it receives from the RSC and may be able to identify the ingress port of the RSC at which the packet arrived. The PSM may be able to apply backpressure to the RSC when the packets are arriving at the RSC faster than the PSM can process them. The RSC may be configured to send interrupts to the PSM when the RSC detects errors, when the RSC sends sync packets to the PSM, and/or when the RSC detects that a sync region (e.g., a sync region configured to include system or user software) is complete.

Figure 4A:
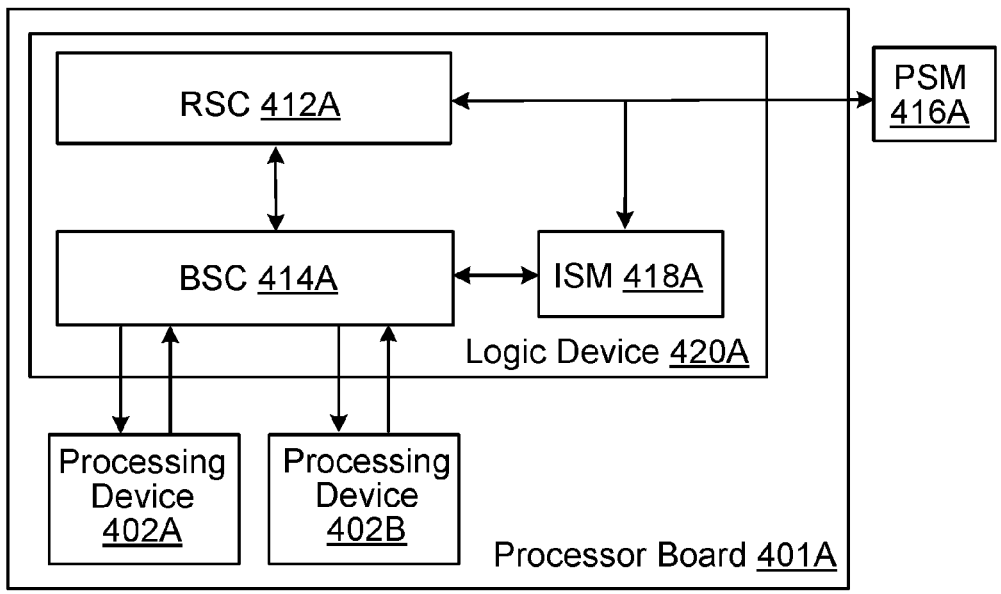
FIGS. 4A-D & 5A-C are block diagrams showing examples of configurations of computing systems that include a single processor board.
Figure 4B:
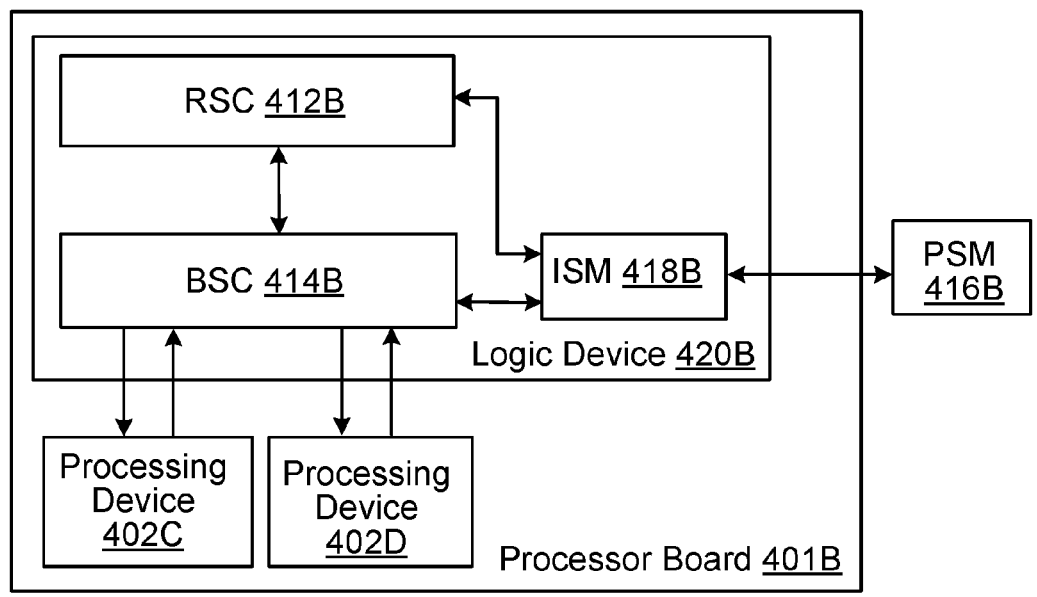
Figure 4C:
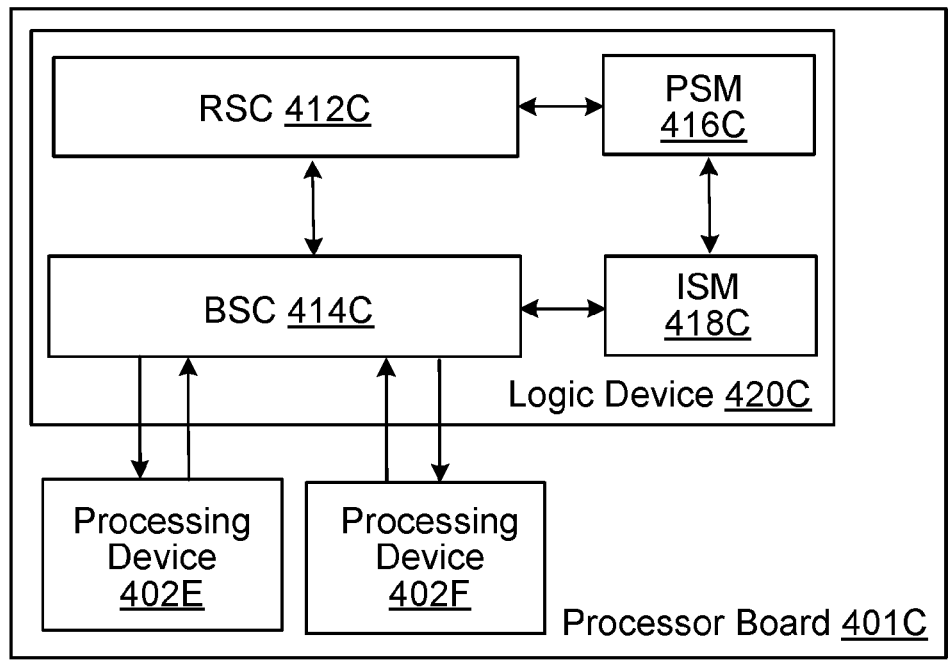
Figure 4D:
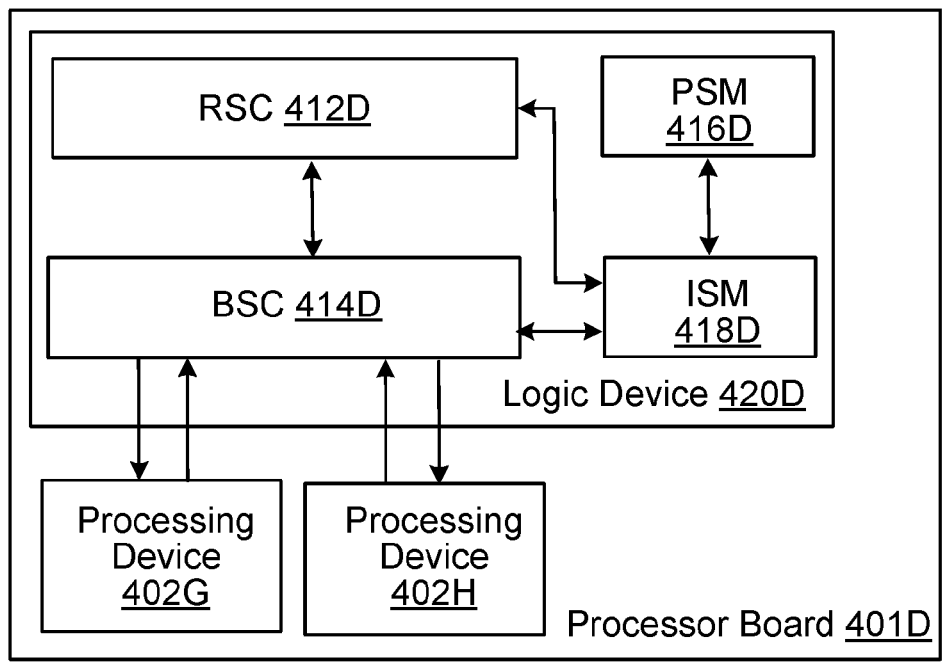

FIGS. 4A-4D show examples of configurations of computing systems 400 that each includes a single processor board 401. The processor boards 401 include logic devices 420 and processing devices 402. The RSCs 412, the BSCs 414, and the ISMs 418 are implemented in the logic devices 420 on the processing boards 401. As shown in FIGS. 4A and 4B, the PSMs 416A and 416B may be implemented external to the processor boards 401A and 401B. The PSMs 416A and 416B may be software running on a host device that communicates control signals with the respective processor boards 401A and 401B using, e.g., Transmission Control Protocol (TCP) on gigabit Ethernet (GBE). As shown in FIGS. 4C and 4D, the PSMs 416C and 416D may be implemented in the respective logic devices 420C and 420D. The PSM 416 may communicate directly with the RSC 412, as shown in FIGS. 4A and 4C, or the PSM 416 may communicate indirectly with the RSC 412 through the ISM 418, as shown in FIGS. 4B and 4D. Configurations other than those shown in FIGS. 4A-4D are possible.

Figure 5A:
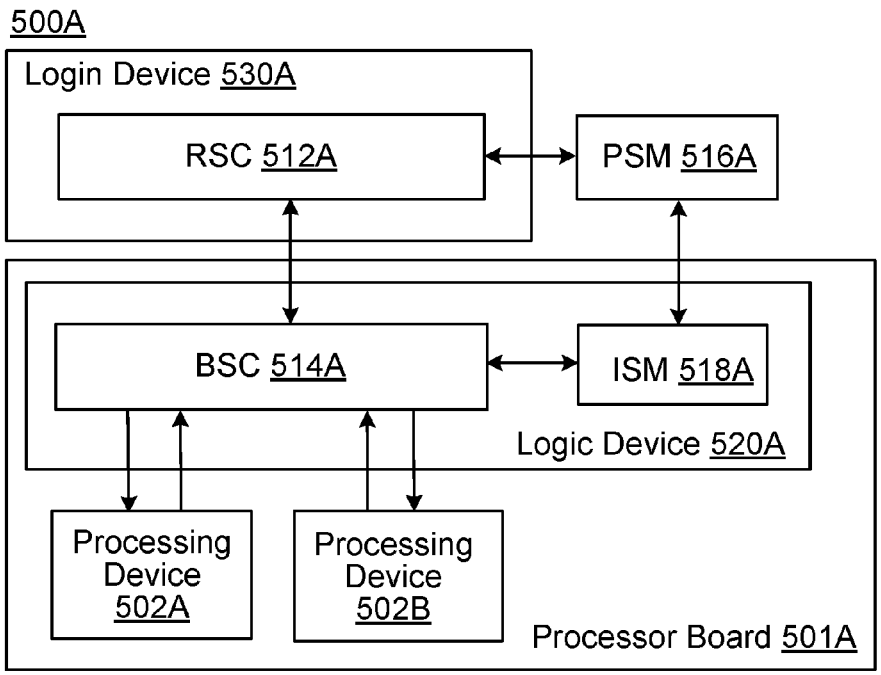
Figure 5B:
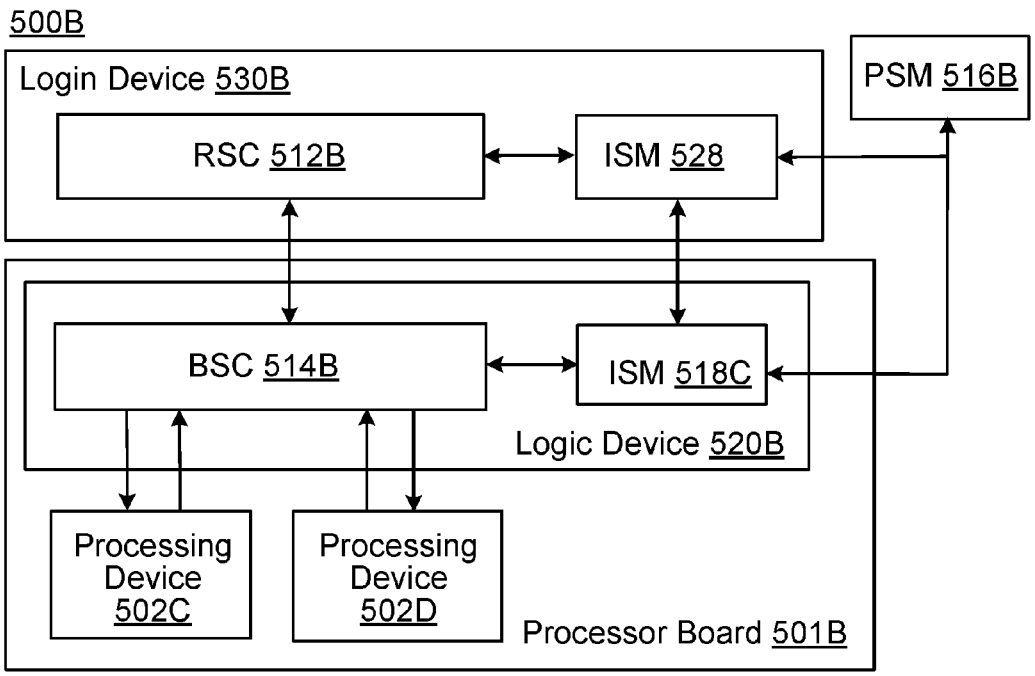
Figure 5C:
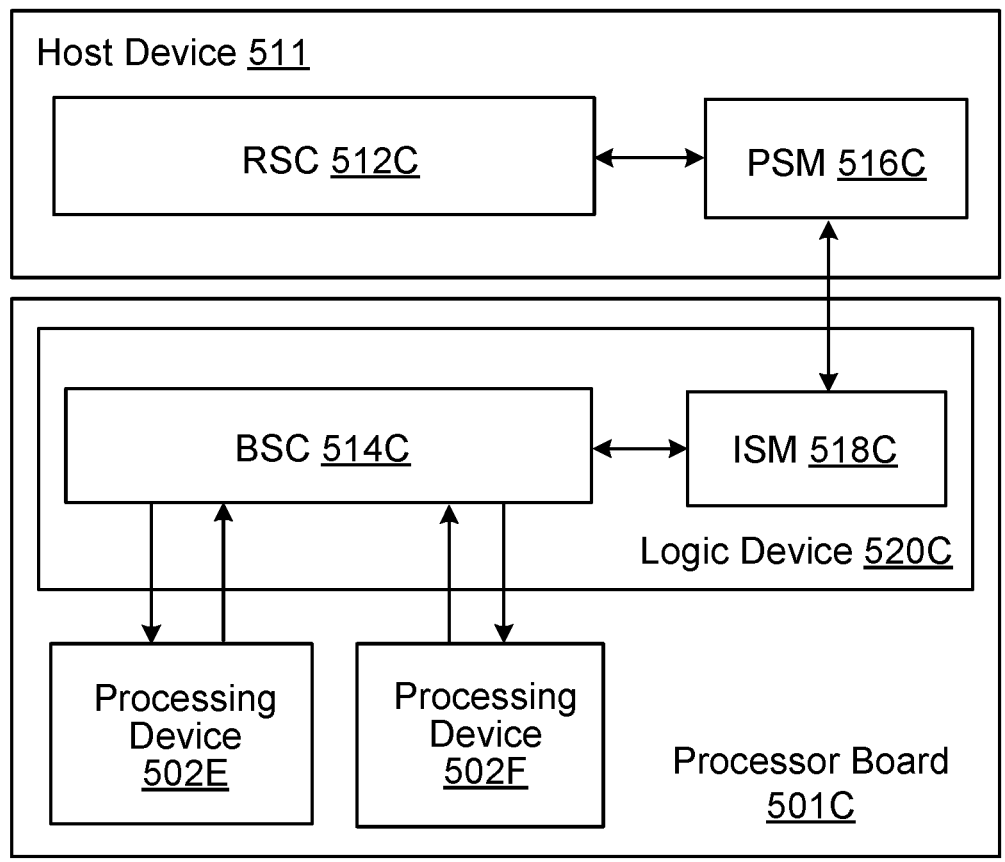

FIGS. 5A-5C show examples of configurations of computing systems 500 that each include a single processor board 501. The processor boards 501 include logic devices 520 and processing devices 502. The BSCs 514 and the ISMs 518 are implemented in the logic devices 520 on the processor boards 501. The RSCs 512 and PSMs 516 are implemented external to the processor boards 501. In FIGS. 5A and 5B, the RSCs 512A and 512B are implemented in respective logic devices 530A and 530B that are external to the processor boards 501A and 501B. The PSMs 516A and 516B are implemented external to the processor boards 501A and 501B and the logic devices 530A and 530B, for example, as software running on a host device that communicates control signals with the processor boards 501A and 501B and the logic devices 530A and 530B using, e.g., TCP or GBE. In FIG. 5C, the RSC 512C and the PSM 516C are implemented in a host device 511, for example, as software running on the host device 511 that communicates control signals with the processor board 501C using, e.g., TCP or GBE. The PSM 516 may communicate directly with the RSC 512, as shown in FIGS. 4A and 4C, or the PSM 516 may communicate indirectly with the RSC 512 through an ISM 528, as shown in FIG. 5B. Configurations other than those shown in FIGS. 5A-5C are possible.

Figure 6:
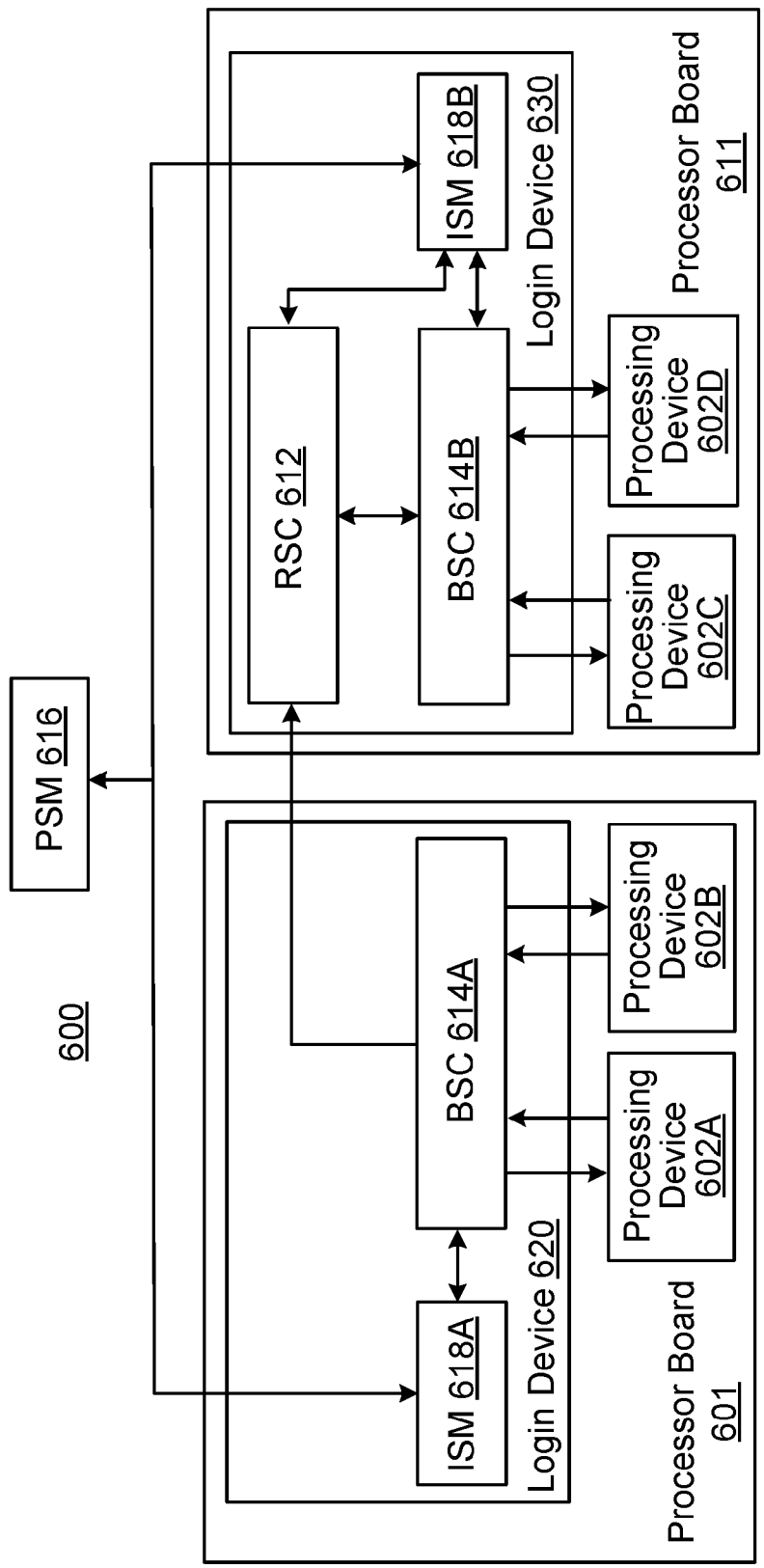
FIG. 6 is a block diagram showing an example of a configuration of a computing system that includes two processor boards.

FIG. 6 shows an example of a configuration of a computing system 600 that includes two processor boards 601 and 611. The processor board 601 includes a logic device 620 and processing devices 602A and 602B. The processor board 611 includes a logic device 630 and processing devices 602C and 602D. Each of the logic devices 620 and 630 include a BSC 614 and an ISM 618. The RSC 612 is implemented in the logic device 630 and communicates with the BSC 614A via a communication channel that carries the sync protocol between the BSC 614A on the processing board 601 and the RSC 612 on the processing board 611. The PSM 616 may be software running on a host device that communicates control signals with the processor boards 601 and 611 using, e.g., TCP on GBE. Other configurations of computing systems that include two processor boards are possible. For example, the RSC 612 may be implemented on a host or a logic device that is external to the processor boards, as shown in FIGS. 5A-5C.

Figure 7:
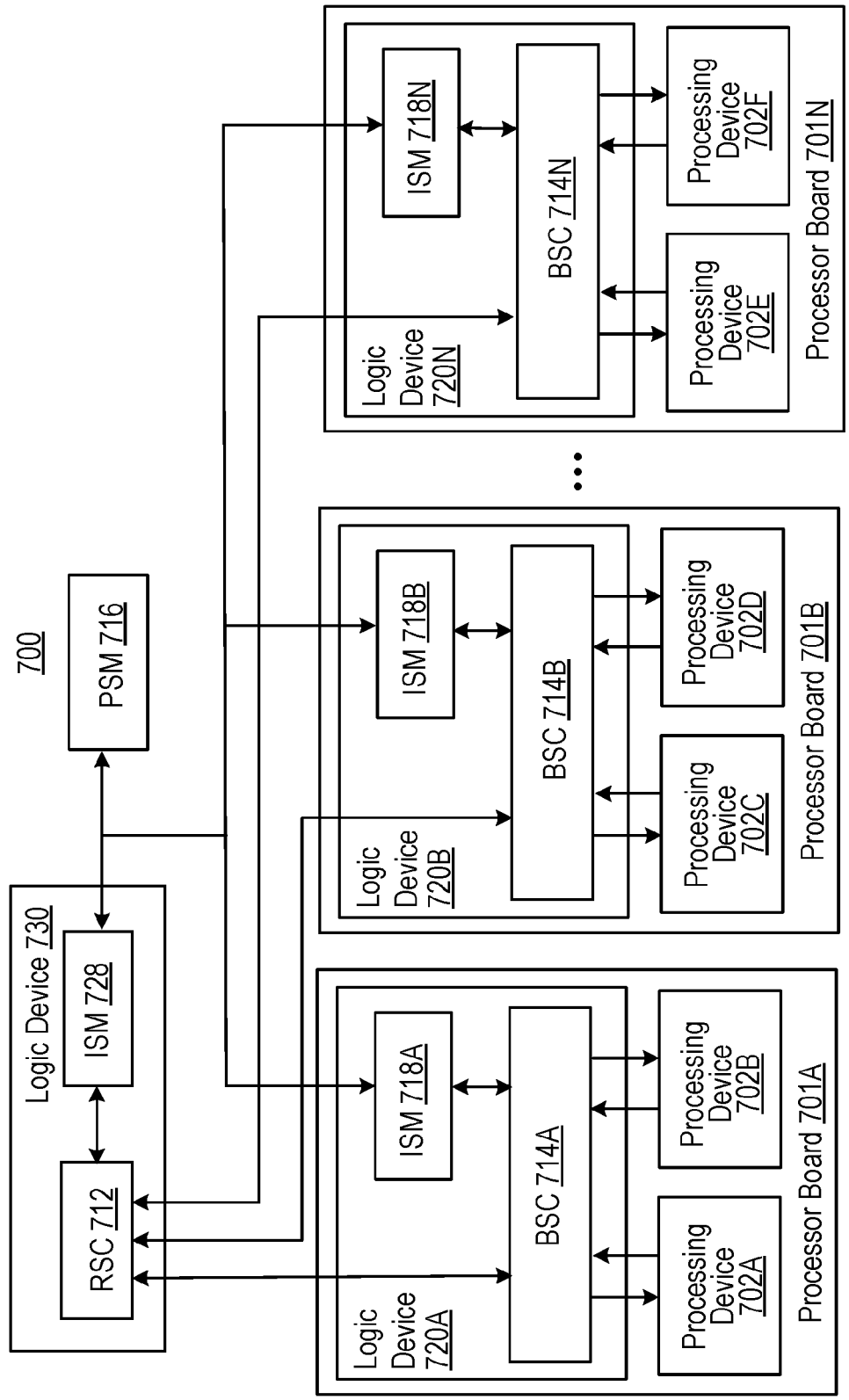
FIG. 7 is a block diagram showing an example of a configuration of a computing that includes three or more processor boards.

FIG. 7 shows an example of a configuration of a computing system 700 that includes three or more processor boards 701A, 701B, through 701N. The RSC 712 and ISM 728 are implemented on a logic device 730 that is external to the processor boards 701A through 701N. The logic device 730 may reside on a processor board that has a sufficient number of communication ports to support the number of processor boards 701A through 701N of the computing system 700. The PSM 716 manages the ISMs 718A through 718N and the ISM 728. The ISM 728 acts as a communication proxy between the RSC 712 and the PSM 716. The PSM 716 manages the RSC 712 via, e.g., TCP on GBE. Other configurations of computing systems that include three or more processor boards are possible. For example, the RSC 712 may be implemented on one of the logic devices 720A, 720B, through 720N, in a configuration similar to the configuration of the computing system 600 shown in FIG. 6.

In FIGS. 4-7, the registers of the sync controllers implemented on the processing boards may be accessible to computing resources of the computing system via packets from computing resources. For example, the computing resources, e.g., the processing devices, may send packets to the sync controllers to configure the registers of the sync controller. As another example, the computing resources may send packets to a device controller, and the device controller processes the packets and configures the registers. For a sync controller such as the RSC external to the processing boards, a computing resource may configure the registers of the sync controller by sending packets to the control plane which processes the packets and configures the registers.

The components of the sync subsystem communicate with each other using sync packets. A sync packet may include fields for specifying a sequence number, a sync process ID, an operation, a size of the packet, a node type, a source device identifier, a destination device identifier, and an optional payload. A sync packet may include a cyclic redundancy code (CRC) to cover errors in the sync packet. Table 1 below provides examples of the fields of the packet. A sync packet may include other fields in addition to those described below.

TABLE 1

| Field Name | Description |
|---|---|
| Sequence Number | A sync controller may maintain a monotonically increasing sequence number for each egress port. Every packet that it egresses, whether passed through from an ingress port, or being originated/modified by the sync controller may have its sequence number updated to the next value for that particular egress port. The sequence number may be used by a sync controller to re-order packets arriving at a given ingress port of the sync controller before the sync controller takes any action on the packets. |
| Sync Process ID | The sync process ID is a number that may be assigned by the system to identify the sync region. In general, for incoming packets, the sync process ID may be used to determine if the packet needs to be processed by the receiving sync controller. For outgoing packets, the sync process ID may be used to provide context for the packet operation. The sync controllers may be configured to ignore this field when the packet indicates an operation that is not associated with a sync region, e.g., a discovery operation. |
| Operation | The operation field specifies a packet operation to be performed. The sync subsystem may support five fundamental operations which include discovery, discovery response, sync region status, sync region complete, and send global event. The sync subsystem may support operations in addition to the five fundamental operations such as sync errors, sync region configuration, configuration acknowledgment, time-based event firing, and debug. The operations are described in more detail below. |
| Size | The size field indicates the size of the entire packet (including the header). The size field may indicate the size of the packet in 8-bit, 16-bit, or 32-bit increments up to a maximum packet size, e.g., 256 bits. |
| Node Type (NT) | The node type field indicates the presence of the source and/or destination device IDs. Examples of values in this field may include:<br>0b00: Neither device ID is present.<br>0b01: Destination device ID is present.<br>0b10: Source device ID present.<br>0b11: Both device IDs are present. |
| Source Device ID (SRC) | The source device ID uniquely identifies the source of the packet being sent. If a packet is being forwarded through a sync controller, the sync controller may modify the packet's sequence number (see sequence number field description above) but may notmodify the source device ID. |
| Destination Device ID (DST) | The destination device ID uniquely identifies the destination (target) of the packet being sent. If a packet is being forwarded through a sync controller, the sync controller may modify the packet's sequence number (see sequence number field description above) but may not modify the destination device ID. |
| Payload | The payload is operation dependent. Some operations will have no payload. The payload may be in increments per the size field (described above). |

Sync System Discovery

The computing system may include physically connected links. The sync subsystem performs a discovery operation to discover the connectivity of the network. The discovery operation may begin at a RSC with a discovery packet. Each sync controller below the RSC may respond to the discovery packet with a discovery response. The discovery responses are collected at the RSC and used to construct a picture of the topology of the sync subsystem. Each sync controller may identify itself using the same device IDs as the processing devices that it manages. This allows the processing device network and the sync subsystem network to be associated with each other. Additional details regarding the discovery of the topology of the processing device network of a computing system are described in U.S. application Ser. No. 14/608,670, filed on Jan. 29, 2015, the entire contents of which are hereby incorporated by reference.

To perform a discovery operation, a discovery packet is broadcast through the sync network. When a sync controller receives the discovery packet, it may replicate the discovery packet on all of its (enabled) downstream ports. The sequence number of a discovery packet may be modified in the discovery packet as discussed above in Table 1. Discovery packets may not be replicated back up toward the RSC. Discovery packets may not have a payload.

When a sync controller receives a discovery packet, it may send a discovery response back to the RSC on its upstream port. In some implementations, the host (or PSM and ISMs) may command the sync controllers to send discovery response packets to the RSC. A discovery response packet may have an NT field value that indicates whether the source device ID of the originator is present. At origination, the discovery response packet need not have a payload. If there are ISCs between the originator and the RSC, the payload may be populated.

Figure 8:
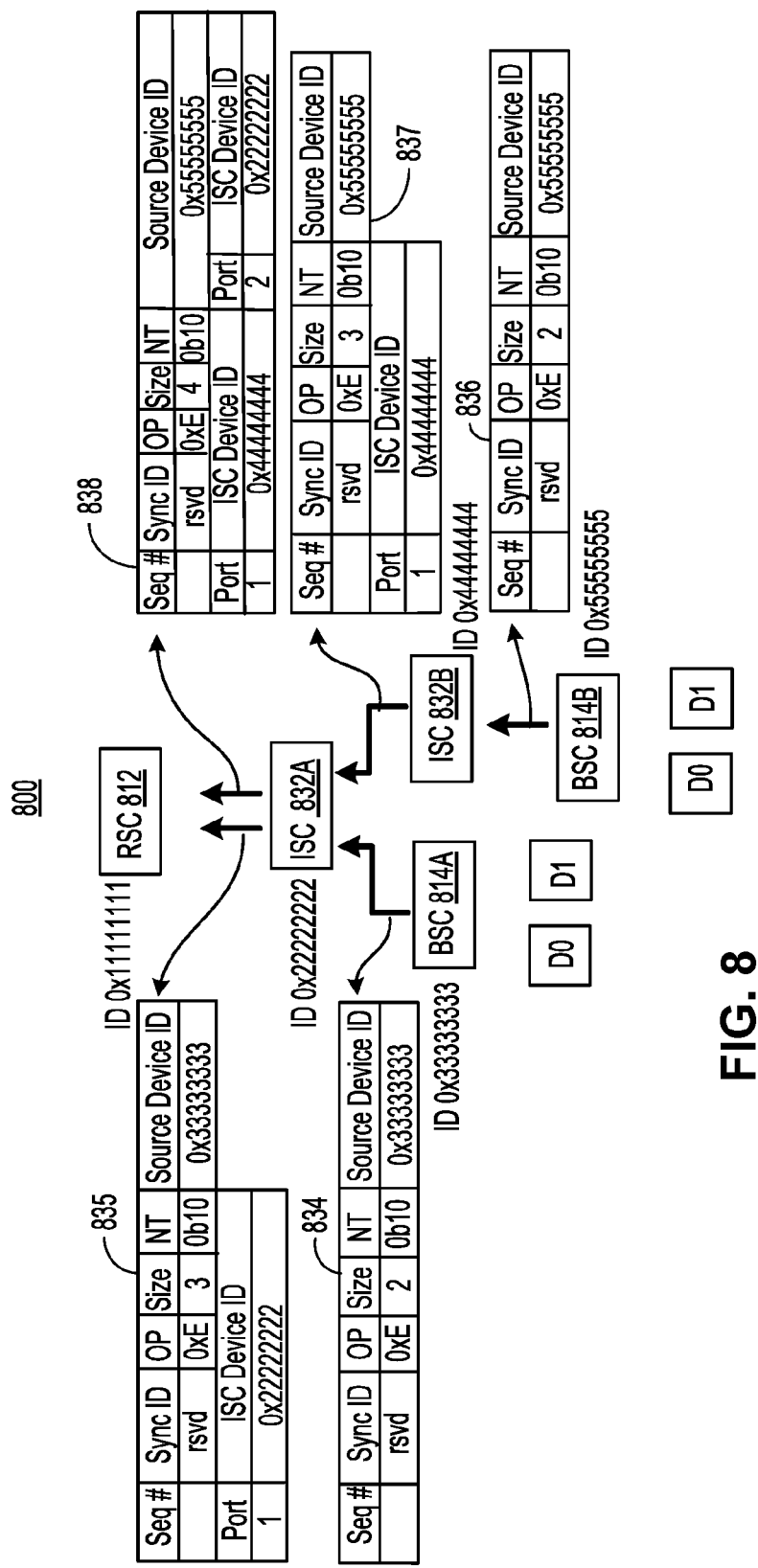
FIG. 8 is a block diagram showing an example of data flow during a discovery operation in a synchronization network that has multiple levels of intermediate nodes.

FIG. 8 shows an example of data flow during a discovery operation in a sync network 800 that has multiple levels of intermediate nodes. Each of the sync controllers ISC 832A, ISC 832B, BSC 814A, and BSC 814B is assigned a device ID, as shown next to the sync controller. In the network 800, all four sync controllers ISC 832A, ISC 832B, BSC 814A, and BSC 814B below the RSC 812 return a discovery response. When the sync network has multiple levels of intermediate nodes, an ISC, e.g., ISC 832A, may receive discovery response packets from multiple downstream sources, e.g., BSC 814A and ISC 832B. As discovery response packets move up toward the RSC 812, they pass through intermediate nodes where topological information for that link may be "chained" onto the discovery response packet, as shown in discovery response packet 838.

The discovery response packet 834 originates at the BSC 814A with device ID 0x33333333. As the packet 834 moves upward toward the RSC 812, it may pass through other sync controllers. If it does, the path it is taking may be appended in the payload of the packet so that it's complete path from the source to the RSC 812 can be determined from the packet.

As shown in FIG. 8, the discovery response packet 834 may be routed through the ISC 832A with device ID 0x22222222. The ISC 832A may add information to the packet payload indicating the number of the packet's ingress port and the device ID of the ISC 832A. For example, the ISC 832A may add a 32-bit value to the packet payload consisting of 12 bits of the number of the packet's ingress port, e.g., Port 1, and 20 bits of the device ID of ISC 832A, e.g., 0x22222222. The packet size field may be increased from 2 to 3, corresponding to the 32 bits added in the payload. The Sequence Number may be changed to the sequence number for the next packet to egress port 0. The modified discovery response packet 835 may then be routed toward the RSC 812 via egress port 0.

The discovery response packet 836 originates at the BSC 814B with device ID 0x55555555. The discovery response packet 836 may be routed through two intermediate nodes ISC 832B and ISC 832A, each of which concatenate port and device ID information as shown in modified discovery response packets 837 and 838.

When the RSC 812 receives the discovery response packets 835 and 838, the RSC 812 records the ingress port on which it arrived. The RSC 812 may then pass the packet and ingress port number to system management software which may use it to build a complete topology of the sync network.

Figure 9:
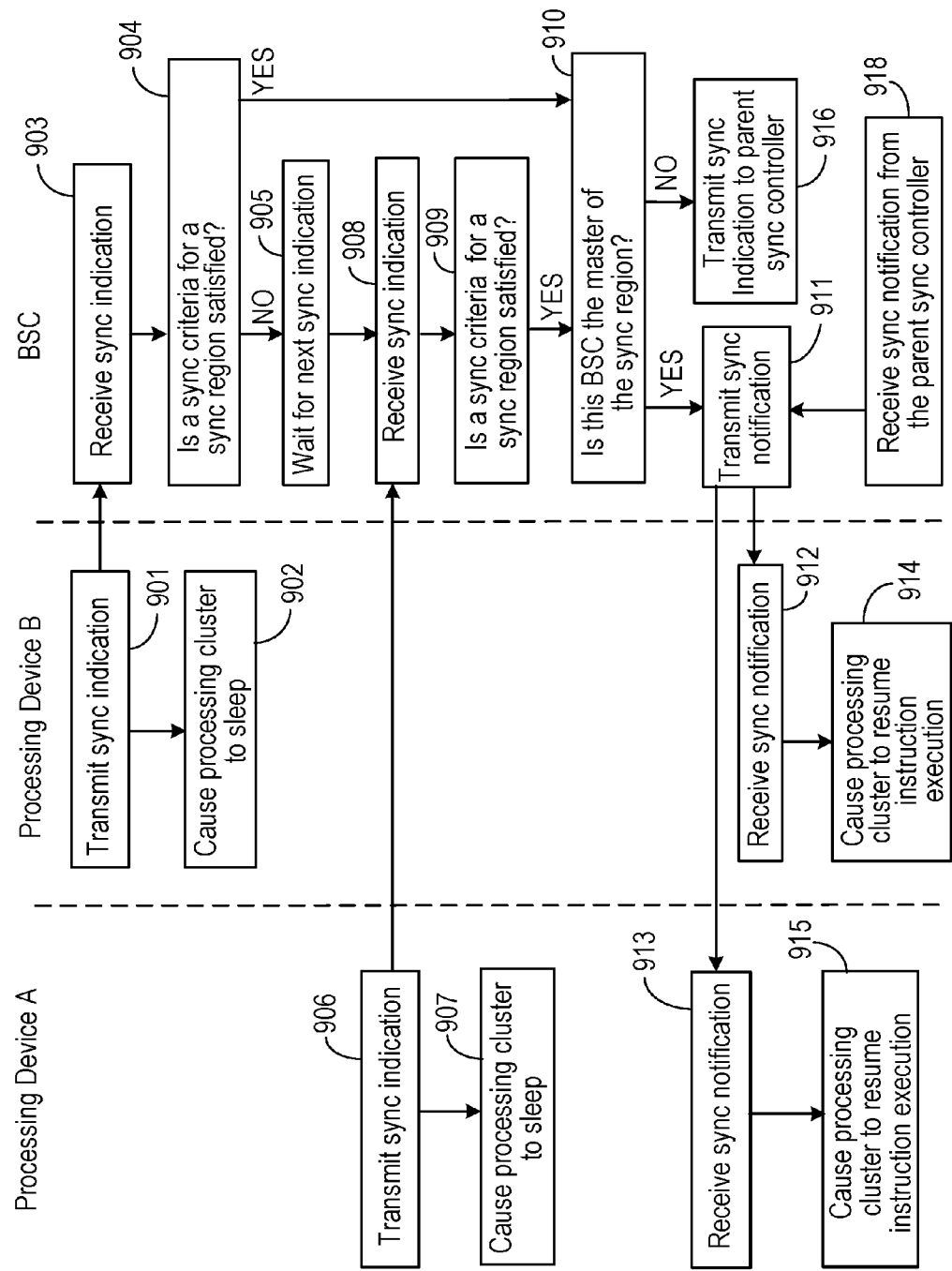
FIGS. 9-12 are flowcharts showing examples of processes for synchronization in a computing system.
Figure 10:
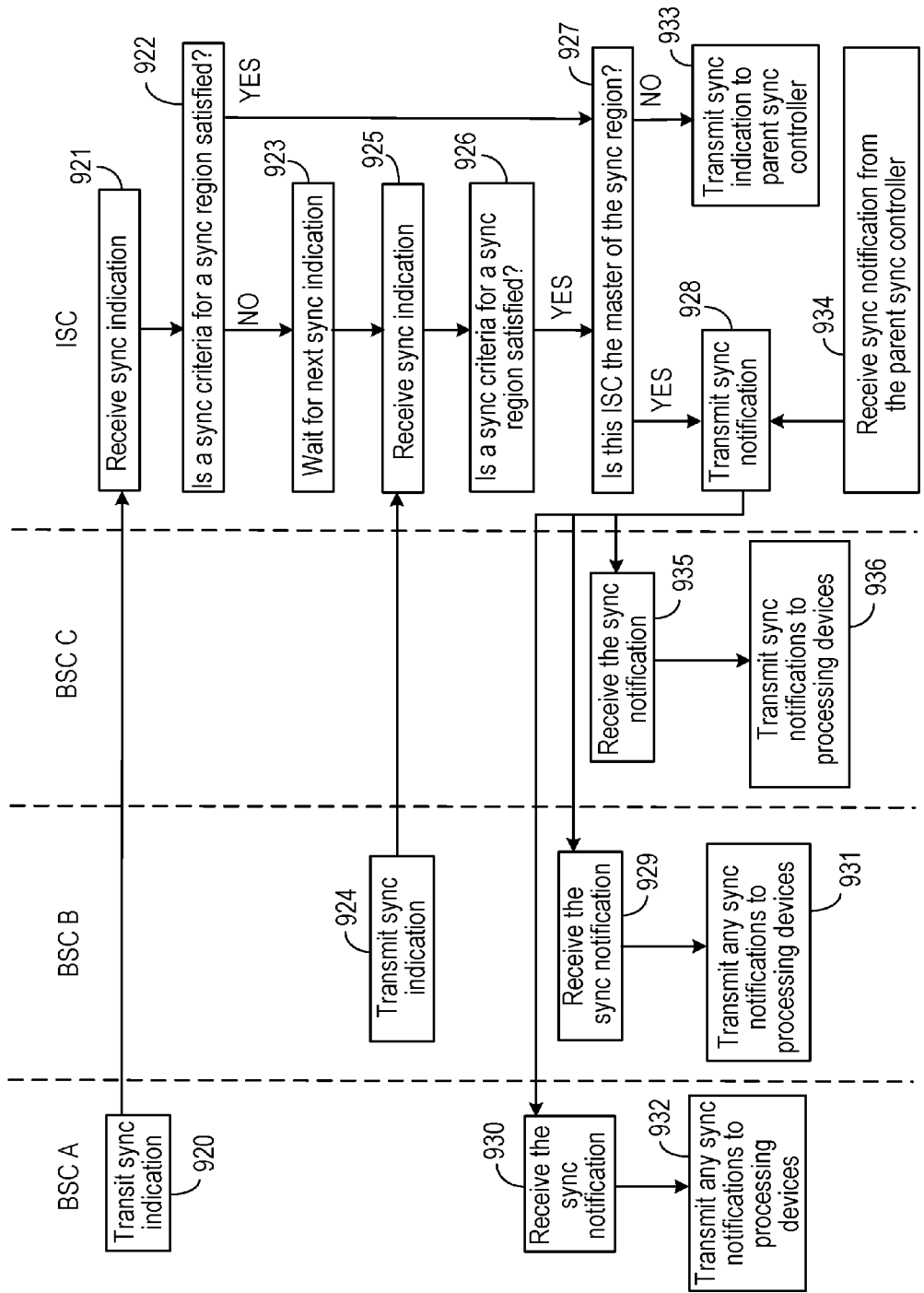
Figure 11:
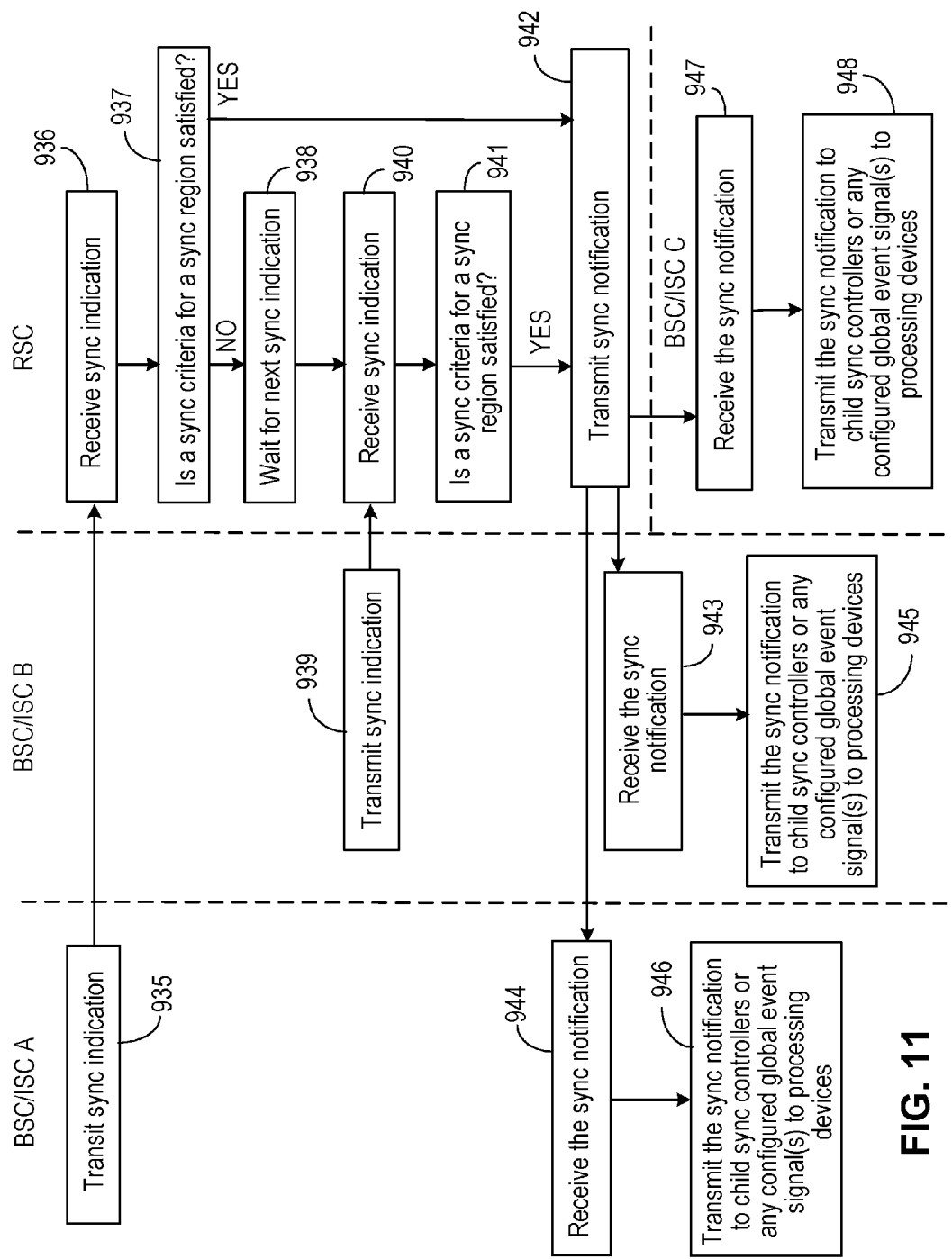
Figure 12:
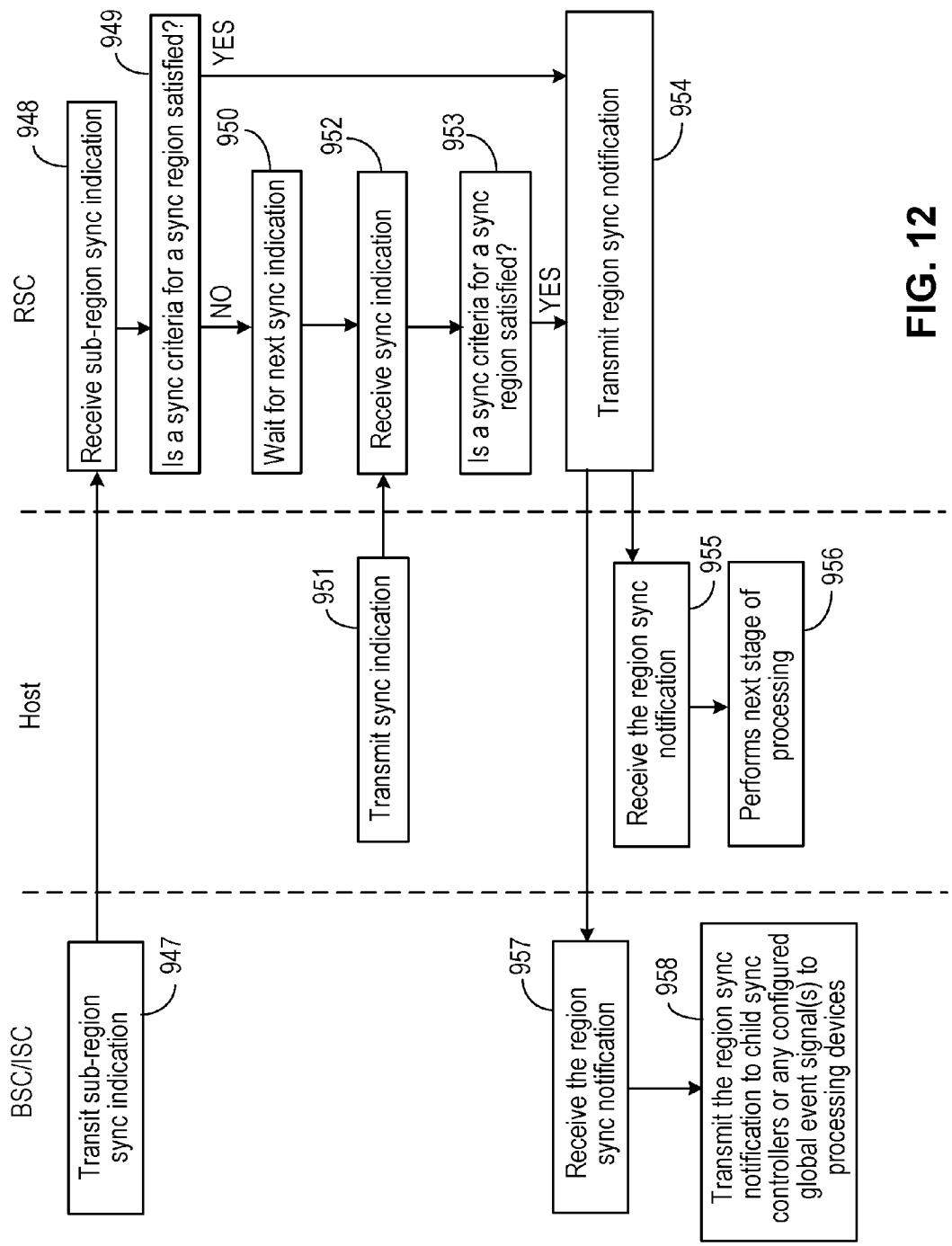

FIGS. 9-12 are flowcharts showing examples of processes for synchronization in a computing system, such as the computing systems previously described in FIGS. 1-8. FIG. 9 is a flowchart showing processes performed by processing devices and a BSC. FIG. 10 is a flowchart showing processes performed by BSCs and an ISC in a computing system with four or more levels such as the computing system shown in FIG. 8. FIG. 11 is a flowchart showing processes performed by BSCs/ISCs and an RSC. FIG. 12 is a flowchart showing processes performed by a BSC/ISC, a host, and a RSC. The processes may include any combination of the details discussed above.

In FIG. 9, a processing device B transmits a sync indication to a BSC at 901. The processing device B may transmit the sync indication when the processing device B determines that sync criteria within the processing device B has been satisfied. For example, the sync criteria may be a processing cluster in the processing device B executing a particular instruction. When the processing cluster executes that instruction, the processing device B transmits the sync indication to a BSC at 901, and may cause device B or the processing cluster to sleep at 902. The processing device B may cause the processing cluster to sleep by, for example, gating the clock signal provided to the processing cluster.

The BSC receives the sync indication from the processing device B at 903. The BSC determines whether the sync criteria for a sync region that is being monitored by the BSC is satisfied by the receipt of the sync indication from the processing device B at 904. The BSC may determine whether the sync criteria is satisfied by storing the status of the processing device B in a tile for the sync region and determining whether all the required indications in the tile for the sync region have been set.

If the sync criteria for a sync region is not satisfied, the BSC waits for the next sync indication at 905. A processing device A transmits sync indication at 906 and may cause device A or a processing cluster in the processing device A to sleep at 907, similar to the process described above with reference to processing device B. The sync indication transmitted by processing device A is received by the BSC at 908. The BSC determines whether the sync criteria for the sync region is satisfied by receipt of the sync indication from the processing device A at 909. The BSC may determine whether the sync criteria is satisfied by storing the status of the processing device A in the tile for the sync region and determining whether all the required indications in the tile for the sync region have been set. If the sync criteria for a sync region is not satisfied, the BSC waits for the next sync indication from any of the processing devices in the sync region that is being monitored by the BSC.

If the sync criteria for the sync region is satisfied at 904 or 909, the BSC determines whether the BSC is the master of the sync region at 910. If the BSC is the master of the sync region and thus the sync region is a complete sync region, the BSC transmits a sync notification to the processing devices in the sync region at 911. The processing devices receive the sync notification at 912 and 913, and act on the sync notification by, for example, causing the processing clusters to resume instruction execution at 914 and 915.

If the BSC is not the master of the sync region and thus the sync region is not a complete sync region, the BSC transmits a sync region indication to a parent sync controller, e.g., an ISC or a RSC, at 916. When the BSC receives a sync notification from the parent sync controller at 918, the BSC transmits a sync notification to the processing devices in the sync region at 911, and the sync notification is received by the processing devices at 912 and 913.

Referring to FIG. 10, BSC A transmits sync indication to an ISC at 920. The ISC receives the sync indication from BSC A at 921 and determines whether sync criteria for a sync region is satisfied by the receipt of the sync indication from BSC A at 922. The ISC may determine whether the sync criteria is satisfied by storing the status of BSC A in a tile for the sync region and determining whether all the required indications in the tile for the sync region have been set.

If the sync criteria for the sync region is not satisfied, the ISC waits for the next sync indication at 923. BSC B transmits sync indication to the ISC at 924. The ISC receives the sync indication from BSC B at 925 and determines whether the sync criteria for the sync region is satisfied by the receipt of the sync indication from the BSC B at 926. The ISC may determine whether the sync criteria is satisfied by storing the status of BSC B in a tile for the sync region and determining whether all the required indications in the tile for the sync region have been set. If the sync criteria for a sync region is not satisfied, the ISC waits for the next sync indication from any of the BSCs in the sync region that is being monitored by the ISC.

If the sync criteria for the sync region is satisfied at 922 or 926, the ISC determines whether the ISC is the master of the sync region at 927. If the ISC is the master of the sync region and thus the sync region is a complete sync region, the ISC transmits sync notification to the BSCs in the sync region at 928. The BSCs receive the sync notification at 929 and 930. If the BSCs have any configured notifications for that sync region, the BSC transmits sync notifications to the processing devices at 931 and 932. Additionally, at 928, the ISC may transmit the sync notification to a BSC C, which was not required to satisfy any sync condition for the sync region but is included in the sync region for receiving notification of the sync region completion. The BSC C receives the sync indication at 935 and transmits the sync notifications configured for that sync region to its processing devices at 936.

If the ISC is not the master of the sync region and thus the sync region is not a complete sync region, the ISC transmits sync indication to a parent sync controller, e.g., another ISC or a RSC, at 933. When the ISC receives sync notification from the parent sync controller at 934, the ISC transmits the sync notification to the BSCs in the sync region at 928. The BSCs receive the sync notification at 929, 930, and 935, and transmit any sync notifications to the processing devices at 931, 932, and 936.

Referring to FIG. 11, BSC/ISC A transmits a sync indication to a RSC at 935. The RSC receives the sync indication from BSC/ISC A at 936 and determines whether sync criteria for a sync region is satisfied by the receipt of the sync indication from BSC/ISC A at 937. The RSC may determine whether the sync criteria is satisfied by storing the status of BSC/ISC A in a tile for the sync region and determining whether all the required indications in the tile for the sync region have been set.

If the sync criteria for the sync region is not satisfied, the RSC waits for the next sync indication at 938. BSC/ISC B transmits a sync indication to the RSC at 939. The RSC receives the sync indication from BSC/ISC B at 940 and determines whether the sync criteria for the sync region is satisfied by the receipt of the sync indication from the BSC/ISC B at 941. The RSC may determine whether the sync criteria is satisfied by storing the status of BSC/ISC B in a tile for the sync region and determining whether all the required indications in the tile for the sync region have been set. If the sync criteria for a sync region is not satisfied, the RSC waits for the next sync indication from any of the BSCs/ISCs in the sync region that is being monitored by the RSC.

Because the RSC monitors only complete sync regions, if the sync criteria for the sync region is satisfied at 937 or 941, the RSC transmits sync notifications to the BSCs/ISCs in the sync region at 942. The sync region includes BSC/ISC A and BSC/ISA B. Additionally, the sync region may include a BSC/ISC C which was not required to satisfy any sync condition for the sync region but is included in the sync region for receiving notification of the sync region completion. The BSCs/ISCs receive the sync notification at 943, 944, and 947, and transmit sync notifications to child sync controllers or any configured global event signal(s) to the processing devices at 945, 943, and 948. In some implementations, the sync region may include a host device which was also not required to satisfy any sync condition for the sync region but is included in the sync region for receiving notification of the sync region completion.

For a BSC/ISC, such as BSC C in FIG. 10 or BSC/ISC C in FIG. 11, that is not required to satisfy any sync condition for a sync region but is included in the sync region for receiving notification of the sync region completion, the BSC/ISC or another controller upstream from the BSC/ISC, e.g., the sync region master controller, may be configured to reflect that the sync region includes the BSC/ISC. In some implementations, a tile of the BSC/ISC may be configured to indicate that its sync criteria for the sync region is satisfied, and thus the BSC/ISC sends a sync indication towards the sync region master upon the tile being configured for the sync region and will receive sync notification from the sync region master. In some implementations, a tile in a controller upstream from the BSC/ISC in the sync region may be configured with an indication already set for the corresponding to the BSC/ISC to represent a completed state for that BSC/ISC.

In some implementations, a tile in a controller upstream from the BSC/ISC in the sync region may be configured to indicate which downstream ports to send the sync region notification, and one of the downstream ports would correspond to the BSC/ISC. For example, referring to FIG. 11, BSC/ISC A may be a BSC corresponding to port 2 of the RSC, BSC/ISC B may be a BSC corresponding to port 5 of the RSC, and BSC/ISC C may be a BSC corresponding to port 7 of the RSC. The RSC's tile for the sync region includes a register that includes which ports are required to receive sync indications for the sync region and a register that indicates which ports to send the sync notifications once the sync region is complete in the RSC. The tile is configured to require receipt of sync indications from BSCs on ports 2 and 5, and to send sync notifications to BSCs on ports 2, 5, and 7. The BSCs on ports 2 and 5 will receive their respective sync notifications and may or may not send any further sync notifications depending on whether the BSC is configured to send sync notifications for that sync region. The BSC on port 7 receives the sync notification and sends out one or more further sync notifications configured for that sync region.

Referring to FIG. 12, a BSC/ISC transmits a sync indication to a RSC at 947. The RSC receives the sync indication from BSC/ISC at 948 and determines whether sync criteria for a sync region is satisfied by the receipt of the sync indication from BSC/ISC at 949. The RSC may determine whether the sync criteria is satisfied by storing the status of BSC/ISC in a tile for the sync region and determining whether all the required indications in the tile for the sync region have been set.

If the sync criteria for the sync region is not satisfied, the RSC waits for the next sync indication at 950. A host transmits a sync indication to the RSC at 951. The RSC receives the sync indication from the host at 952 and determines whether the sync criteria for the sync region is satisfied by the receipt of the sync indication from the host at 953. The RSC may determine whether the sync criteria is satisfied by storing the status of the host in a tile for the sync region and determining whether all the required indications in the tile for the sync region have been set. If the sync criteria for the sync region is not satisfied, the RSC waits for the next sync indication from any of the BSCs/ISCs or the host in the sync region that is being monitored by the RSC.

If the sync criteria for the sync region is satisfied at 949 or 953, the RSC transmits sync notification to the BSCs/ISCs in the sync region and the host at 954. The host receives the sync notification at 955 and performs the next stage of processing at 956. The BSCs/ISCs receive the sync notifications at 957 and transmit sync notifications to child sync controllers or to the processing devices at 958.

Implementations of the subject matter and the operations described in this specification can be implemented in digital electronic circuitry, or in computer software, firmware, or hardware, including the structures disclosed in this specification and their structural equivalents, or in combinations of one or more of them.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. For example, suitable processors may include custom logic devices such as application-specific integrated circuits (ASICs), field-programmable gate arrays (FPGAs), and programmable logic devices (PLDs).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can be implemented in combination in a single implementation. Conversely, various features that are described in the context of a single implementation can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A system comprising a host device, a plurality of processing devices, a first-level sync controller, a first second-level sync controller, and a second second-level sync controller wherein:
   the host device is configured to transmit instructions and data to the plurality of processing devices and to transmit sync information to the first-level sync controller, the first second-level sync controller, and the second second-level sync controller;
   the first-level sync controller is configured to receive a first portion of the sync information, wherein the first portion (i) identifies a first sync process, (ii) indicates that the first-level sync controller is a master controller of the first sync process; and (iii) identifies a group of second-level sync controllers that are executing the first sync process, the group of second-level controllers including the first second-level sync controller and the second second-level sync controller;
   the first second-level sync controller is configured to receive a second portion of the sync information, wherein the second portion (i) identifies the first sync process and (ii) identifies a first group of processing devices that are executing the first sync process;
   the second second-level sync controller is configured to receive a third portion of the sync information, wherein the third portion (i) identifies the first sync process and (ii) identifies a second group of processing devices that are executing the first sync process;
   a first processing device of the plurality of processing devices is configured to execute a first plurality of instructions and transmit a first sync indication to the first second-level controller;
   a second processing device of the plurality of processing devices is configured to execute a second plurality of instructions and transmit a second sync indication to the second second-level controller;
   the first second-level controller is configured to:
      receive the first sync indication from the first processing device;
      store an indication, associated with the first sync process, that the first sync indication was received from the first processing device;
      determine that a sync indication has been received from all processing devices of the first group of processing devices;
      transmit a third sync indication to the first-level controller;
   the second second-level controller is configured to:
      receive the second sync indication from the second processing device;
      store an indication, associated with the first sync process, that the second sync indication was received from the second processing device;
      determine that a sync indication has been received from all processing devices of the second group of processing devices;
      transmit a fourth sync indication to the first-level controller;
   the first-level controller is configured to:
      receive the third sync indication;
      store an indication, associated with the first sync process, that the third sync indication was received from the first second-level controller;
      receive the fourth sync indication;
      store an indication, associated with the first sync process, that the fourth sync indication was received from the second second-level controller;
      determine that a sync indication has been received from all second-level controllers in the group of second-level controllers; and
      transmit a notification that the first sync process is complete.

2. The system of claim 1, wherein the first-level controller is configured to send the notification to the host device.

3. The system of claim 1, wherein:
   the first-level controller is further configured to transmit a first notification to the first second-level controller and to transmit a second notification to the second second-level controller; and
   the first second-level controller is configured to send a third notification to the first processing device.

4. The system of claim 3, wherein the first processing device is configured to execute instructions in response to receiving the third notification from the first second-level controller.

5. The system of claim 1, wherein the host device transmits the sync information indirectly to the first-level sync controller, the first second-level sync controller, and the second second-level sync controller.

6. The system of claim 3, wherein:
the first-level controller is further configured to:
determine a time for transmission of notifications to processing devices;
include the time in the first notification; and
the first second-level controller is configured to send the third notification at the determined time.

7. The system of claim 1, wherein the first processor is configured to send the first sync indication by changing a state of an output pin of the first processing device.

8. A method, implemented by a first sync controller, comprising:
receiving sync information, wherein the sync information (i) identifies a first sync process, (ii) indicates that the first sync controller is not a master controller of the first sync process, and (iii) identifies a group of components executing the first sync process, the group comprising a first processing device;
receiving a first sync indication from the first processing device;
storing an indication, associated with the first sync process, that the first sync indication was received from the first processing device;
determining that a sync indication has been received from all components of the first group of components; and
transmitting a second sync indication to a second sync controller.

9. The method of claim 8, further comprising:
receiving from the second sync controller a first notification that the first sync process is complete; and
transmitting a second notification to the first processing device that the first sync process is complete.

10. The method of claim 8, wherein storing the indication comprises storing a value in a register.

11. The method of claim 8, wherein transmitting the second sync indication to the second controller comprises using a serial connection.

12. The method of claim 8, wherein receiving the first sync indication comprises reading a state of an output pin of the first processing device.

13. The method of claim 8, wherein the second sync controller is a master controller for the first sync process.

14. The method of claim 8, wherein the sync information (i) identifies a second sync process, (ii) indicates that the first sync controller is a master controller of the second sync process, and (iii) identifies a second group of components executing the second sync process.

15. The method of claim 8, wherein transmitting the second sync indication to the second sync controller comprises sending a packet.

16. The method of claim 8, wherein the group of components comprises a buffer and wherein the method further comprises receiving a third sync indication from the buffer.

17. A processing device comprising:
a plurality of processor cores;
a first input port for receiving data;
a first output port for transmitting data;
a second input port for receiving sync indications;
a second output port for transmitting sync indications;
at least one memory comprising executable instructions that configure the processing device to perform operations including the following:
receive first data via the first input port;
process the first data with at least one processor core to generate second data;
transmit the second data via the first output port;
determine that criteria have been satisfied for sending a sync indication;
transmit a sync indication to a sync controller via the second output port in response to determining that the criteria have been satisfied;
receive a sync notification via the second input port; and
perform subsequent processing in response to receiving the sync notification.

18. The processing device of claim 17, wherein the first input port comprises a serial connection, and the at least one memory comprising executable instructions that configure the processing device to receive first data via the first input port comprises:
the at least one memory comprising executable instructions that configure the processing device to receive packets comprising the first data via the serial connection.

19. The processing device of claim 17, wherein the first output port comprises a serial connection, and the at least one memory comprising executable instructions that configure the processing device to transmit the second data via the first output port comprises:
the at least one memory comprising executable instructions that configure the processing device to transmit packets comprising the second data via the serial connection.

20. The processing device of claim 17, wherein the second output port comprises a wire connection, and the at least one memory comprising executable instructions that configure the processing device to transmit the sync indication to the sync controller via the second output port comprises:
the at least one memory comprising executable instructions that configure the processing device to assert a signal that is transmitted over the wire connection via the second output port.

21. The processing device of claim 17, wherein the second input port comprises a wire connection, and the at least one memory comprising executable instructions that configure the processing device to receive the sync notification via the second input port comprises:
the at least one memory comprising executable instructions that configure the processing device to receive an asserted signal transmitted over the wire connection via the second input port.

* * * * *